(12) United States Patent
Foschini et al.

(10) Patent No.: US 7,006,795 B2
(45) Date of Patent: *Feb. 28, 2006

(54) WIRELESS COMMUNICATION SYSTEM WITH INTERFERENCE COMPENSATION

(75) Inventors: Gerard J Foschini, Sayrerville, NJ (US); Syed Ali Jafar, Stanford, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 684 days.

This patent is subject to a terminal disclaimer.

(21) Appl. No.: 10/005,650

(22) Filed: Dec. 5, 2001

(65) Prior Publication Data

US 2003/0104784 A1 Jun. 5, 2003

(51) Int. Cl.
*H04B 1/00* (2006.01)
*H04B 15/00* (2006.01)

(52) U.S. Cl. .................... 455/63.1; 455/10; 455/114.2; 455/423; 455/501; 370/335; 370/342; 375/148; 375/346; 375/347; 375/349

(58) Field of Classification Search ............... 455/10, 455/63.1, 67.11, 114, 423–425, 501–506; 370/335, 342; 375/148, 346–351

See application file for complete search history.

(56) References Cited

OTHER PUBLICATIONS

S. Vishwanath, et al, "On The Capacity Of Multiple Input Multiple Output Broadcase Chann is" Dept. of Electrical Engineering, Stanford University, Stanford, CA 94304, http://wsl.stanford.edu/, Submitted to International , Cite last modified May 1, 2000.

Serio Verdu, Multiuser Detection, Cambridge University Press, NYC.,—"Optimum Multiuser Detection", pp. 154-233, 1998.

Max H. M. Costa, "Writing on Dirty Paper", IEEE Transactions on Information Theory, vol. IT-239, No. 3, pp. 439-441, May 1983.

Uri Erez, et al., "Capacity and Lattice-Strategies For Cancelling Known Interference", International Symposium on Information Theory and its Applications, Hololulu, Hawaii, USA, Nov. 5-8, 2000.

F.R. Farrokhi, et al., "Link-Optimal Space-Time Processing with Multiple Transmit and Receive Antennas", IEEE Communications Letters vol. 5, No. 3, pp. 85-27, Mar. 2001.

G.G. Raleigh, "Spatio-Temporal Coding for Wireless Communication", IEEE Transactions on Communications, vol. 46, No. 3, pp. 357-366, Mar. 1998.

*Primary Examiner*—Stephen D'Agosta
(74) *Attorney, Agent, or Firm*—Irena Rappaport; James Milton

(57) ABSTRACT

A method and apparatus for assigning the data rate and/or power level to the mobile terminals without determining the highest theoretical system throughput, and without determining the highest weighted system throughput. An order is imposed on the terminals and the data rate and/or power covariance matrices are assigned such that the data rates of the terminals having a lower index in the order will not be decreased due to the presence of the terminals having a higher index in the order, and this is accomplished without changing the power covariance matrixes of the antennas involved in the communication with the lower index terminals. Thus, the assignment is made to the terminals based on the terminals requirements without regard to the interference introduced by the terminals with a higher index in the order since this interference will be compensated for by the compensation technique when the compensation technique process the terminals in accordance with the order. The invention reduces the amount of computation necessary to implement such compensation techniques on an ongoing, real-time basis in a real-world system.

26 Claims, 13 Drawing Sheets

FIG. 3

| MOBILE TERMINALS BEING COMPENSATED | $120_{51}$-M | $120_{52}$-M | $120_{53}$-M |
|---|---|---|---|
| | $120_{52}$-M | | |
| | $120_{53}$-M | $120_{53}$-M | |

MOBILE TERMINALS LISTED BELOW THE HEADER ARE
PHANTOMS TO THE MOBILE TERMINALS IN THE HEADER

FIG. 10

| MOBILE TERMINALS BEING COMPENSATED | $220_{51}$-DM | $220_{52}$-DM | $220_{83}$-DM | $220_{94}$-DM | $220_{95}$-DM | $220_{56}$-DM |
|---|---|---|---|---|---|---|
| $220_{52}$-DM | | | | | | |
| $220_{83}$-DM | $220_{83}$-DM | | | | | |
| $220_{94}$-DM | $220_{94}$-DM | $220_{94}$-DM | | | | |
| $220_{95}$-DM | $220_{95}$-DM | $220_{95}$-DM | $220_{95}$-DM | | | |
| $220_{56}$-DM | $220_{56}$-DM | $220_{56}$-DM | $220_{56}$-DM | $220_{56}$-DM | | |

MOBILE TERMINALS LISTED BELOW THE HEADER ARE
PHANTOMS TO THE MOBILE TERMINALS IN THE HEADER

WIRELESS COMMUNICATION SYSTEM WITH INTERFERENCE COMPENSATION

CROSS REFERENCE TO RELATED APPLICATION

A related, co-pending application is U.S. patent application Ser. No. 10/005,506 filed concurrently herewith by Foschini et al., and assigned to the assignee hereof, entitled "Wireless Communication System With Interference Compensation".

BACKGROUND OF THE INVENTION

This invention relates to wireless communication systems and, more particularly, to wireless communication systems that use techniques that compensate for interference among signals within the system.

Signals transmitted between base stations and mobile terminals within a wireless communication system interfere with one another to some extent, thereby negatively affecting the ability of the system to accurately receive and decode these signals. However, various techniques are known to compensate for such interference. For example, so-called dirty paper coding adjusts a signal, before it is transmitted, to take into account some of the interference the signal will encounter after it is transmitted. By contrast, so-called multi-user detection estimates the interference in a received signal and subtracts this estimated interference from the signal. Techniques such as the two just described allow signals to be transmitted within the system at, for example, increased data rates and/or at lower power levels, without increasing the error rates, thereby increasing the overall system throughput, i.e., the rate of communication traffic the system can handle at any given time. This throughput improvement allows the system, for example, to accommodate more users.

SUMMARY OF THE INVENTION

However, a problem arises because of the way in which in the disclosures of dirty paper coding and multi-user detection (which are largely theoretical in nature) the assignment of the data rates (or set of data rates) and/or power covariance matrices—the distribution of power levels amongst the transmit or receive antennas—for each mobile terminal is determined. Typically, data rates and/or power covariance matrices are assigned based on the theoretical highest system throughput (also sometimes referred to in the art as the sum rate) that can be achieved using the particular compensation technique at a particular time, given the conditions that then exist. The conditions are typically, e.g., the number of terminals and their locations, the uplink and downlink transmit power levels, etc. There may also be discussions assigning data rate and/or power level based on weighted theoretical highest system capacity, which determines the theoretical highest system capacity when certain mobile terminals' rates are weighted. The weighting can be, for example, the revenue per bit per second associated with the mobile terminal.

The present inventors have realized that it is advantageous to assign an operating parameter value, such as a data rate and/or power level, to the terminals without determining the highest theoretical system throughput, and without determining the highest weighted system throughput. This can be accomplished by imposing an order on the terminals and assigning the operating parameter such that at least one of operating parameter values of terminals that have a lower index in the order will not be made worse due to the presence of terminals having a higher index in the order. (Note, a terminals index in the order is its order number, so a terminal that is first in the order has the lowest order index, of one, and a terminal that is second in the order has an index of two and is higher in the order than the terminal whose index is one.) Thus, the assignment is made to the terminals based on the terminals requirements without regard to the interference introduced by the terminals with a higher index in the order since this interference will be compensated for by the compensation technique when the compensation technique process the terminals in accordance with the order. Assigning the data rate and/or power level to the mobile terminals without determining the theoretical highest system throughput, and without determining the highest weighted system throughput is in marked contrast to the prior art approach in which at least one of the above is maximized through complex calculations. Thus, the invention reduces the amount of computation necessary to implement such techniques on an ongoing, real-time basis in a real-world system.

Use of the invention may not yield the theoretically optimum use of system capacity implied by the prior art calculations in some cases. However, the level of capacity that can be achieved is sufficiently high as to provide an advantageous engineering trade-off, given that the invention allows interference reduction techniques such as dirty paper coding and multi-user detection to be used with a significantly reduced computational burden.

The order can be determined randomly or, alternatively, the order can be based on some predefined criterion or criteria that may prove advantageous in using as much system throughput as possible without actually having to calculate the theoretically highest system throughput. For example, the order can be based on the order in which the mobile terminals initiated a communication session with the base station(s) (either ascending or descending); the order might be based on the amount of data to be transmitted to or from the various mobile terminals (also either ascending or descending); or the order might be based on which mobile terminal could make best use of the communication resources on an individual basis (as opposed to the overall basis used in the prior art calculations). Additionally, an order can be imposed for downlink signals, for uplink signals, or for both. In the case where the order is imposed for both, the same criteria can be used to determine the order on both downlink and uplink communications, or alternatively different criteria can be used for downlink and uplink communication.

As noted above, not every signal can be "cleaned up" by having interference from every other signal taken account of. Indeed, in systems embodying the principles of the present invention it is the order that determines which terminals' signals are taken account of in compensating for interference in which other terminals' signals. The present inventors have realized that to the extent that particular terminals' signals are removed (more precisely accounted for) as a source of interference in another terminal's signals, it is as though the particular terminals do not exist from the standpoint of the other terminals and, as such, the particular terminals are referred to herein as the other terminals "phantoms."

BRIEF DESCRIPTION OF THE DRAWINGS

FIG. 3 is a table illustrating for the cell shown in FIG. 2a which terminals' signals are taken account of in compensating for interference in which other terminals' signals when multi-user detection is used;

FIG. 10 is a table illustrating for the portion of the system shown in FIG. 9 which terminals' signals are taken account of in compensating for interference in which other terminals' signals when the order and multi-user detection are used.

DETAILED DESCRIPTION

Figure 1:
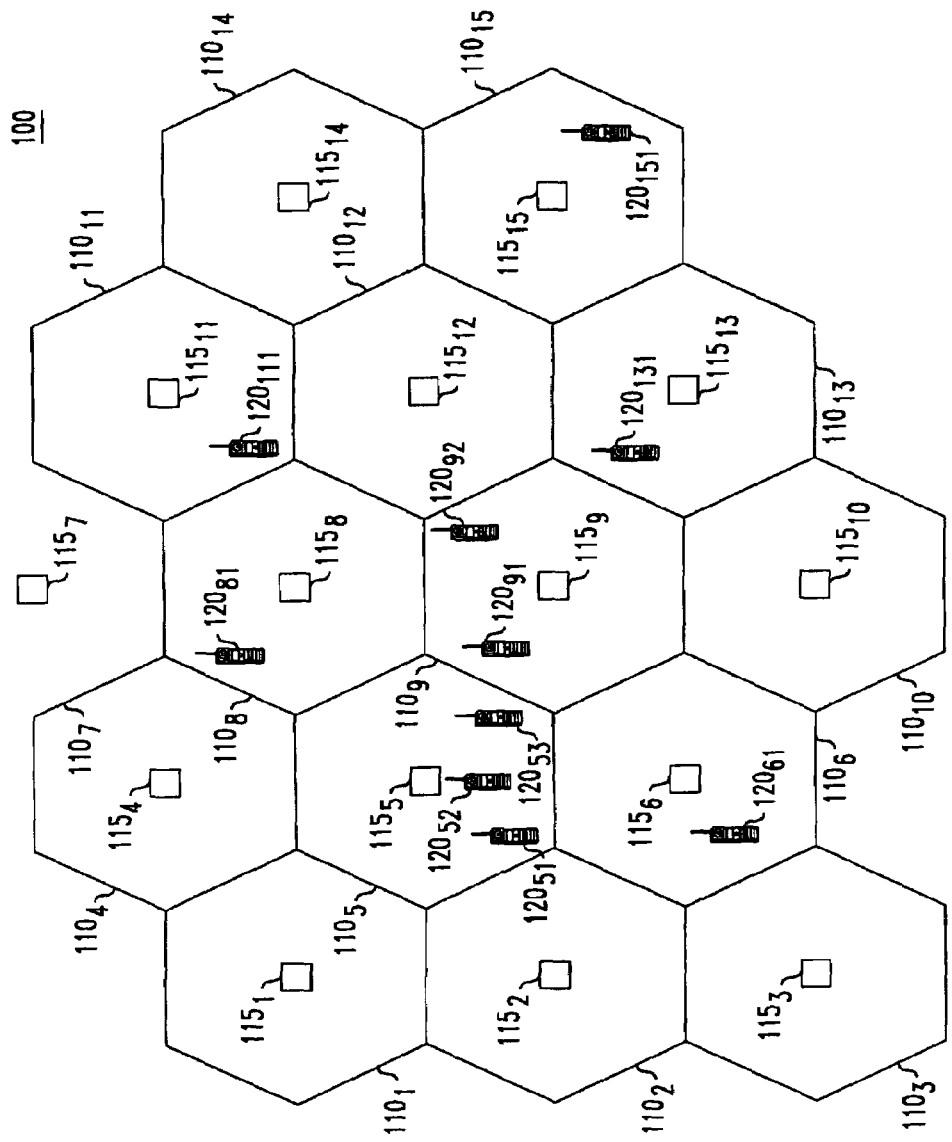
FIG. 1 illustrates a portion of a wireless communication system.

FIG. 1 illustrates a portion of a wireless communication system 100. The geographic area serviced by system 100 is divided into a plurality of spatially distinct areas called "cells." Although cells $110_1, \ldots 100_{15}$ are illustrated as a hexagon in a honeycomb pattern, each cell is actually of an irregular shape that depends on obstacles and topography in the geographical area. Each cell $110_1, \ldots 100_{15}$ contains a base station $115_1 \ldots 115_{15}$, respectively. Each base station $115_1 \ldots 115_{15}$ includes equipment to communicate with Mobile Switching Center ("MSC") (not shown), which is connected to local and/or long-distance transmission network, such as a public switch telephone network (PSTN). Each base station $115_1 \ldots 115_{15}$ also includes radios and antennas that the base station uses to communicate with mobile terminals.

Compensation Techniques

As described above, signals transmitted between base stations and mobile terminals within a wireless communication system interfere with one another to some extent, thereby negatively affecting the ability of the system to accurately receive and decode these signals. Various techniques are known to compensate for such interference. Among these techniques are multi-user detection and dirty paper coding.

Dirty paper coding provides as good or better interference reduction on the downlink, but on the uplink dirty paper coding is currently impractical to implement and requires significantly more processing than multi-user detection. The present inventors have thus realized that it is advantageous to use dirty paper coding on downlink signals and multi-user detection on uplink signals. In order to explain the operation of a system according to one embodiment of the invention where dirty paper coding is used on the downlink and multi-user detection is used on the uplink, the operation of multi-user detection and dirty paper coding is now explained. Both multi-user detection and dirty paper coding will first be explained in a one-cell context. After the concept of order, pursuant to the invention, is introduced, both of these compensation techniques will also explained in a multi-cell, and an entire network context. Using these compensation techniques in the multi-cell or entire network contexts provides the advantage of an even larger throughput improvement than in the one cell context. As described above, this throughput improvement allows the system, for example, to accommodate more users.

As is explained in more detail with reference to FIG. 2a for the uplink and FIG. 2b for the downlink, multi-user detection estimates the interference in a received signal and subtracts this estimated interference from the signal. For further information on the operation and use of multi-user detection see, for example, S. Verdu, MULTI USER DETECTION, Cambridge University Press, pp. 154–233, 1998, incorporated herein by this reference.

Figure 2A:
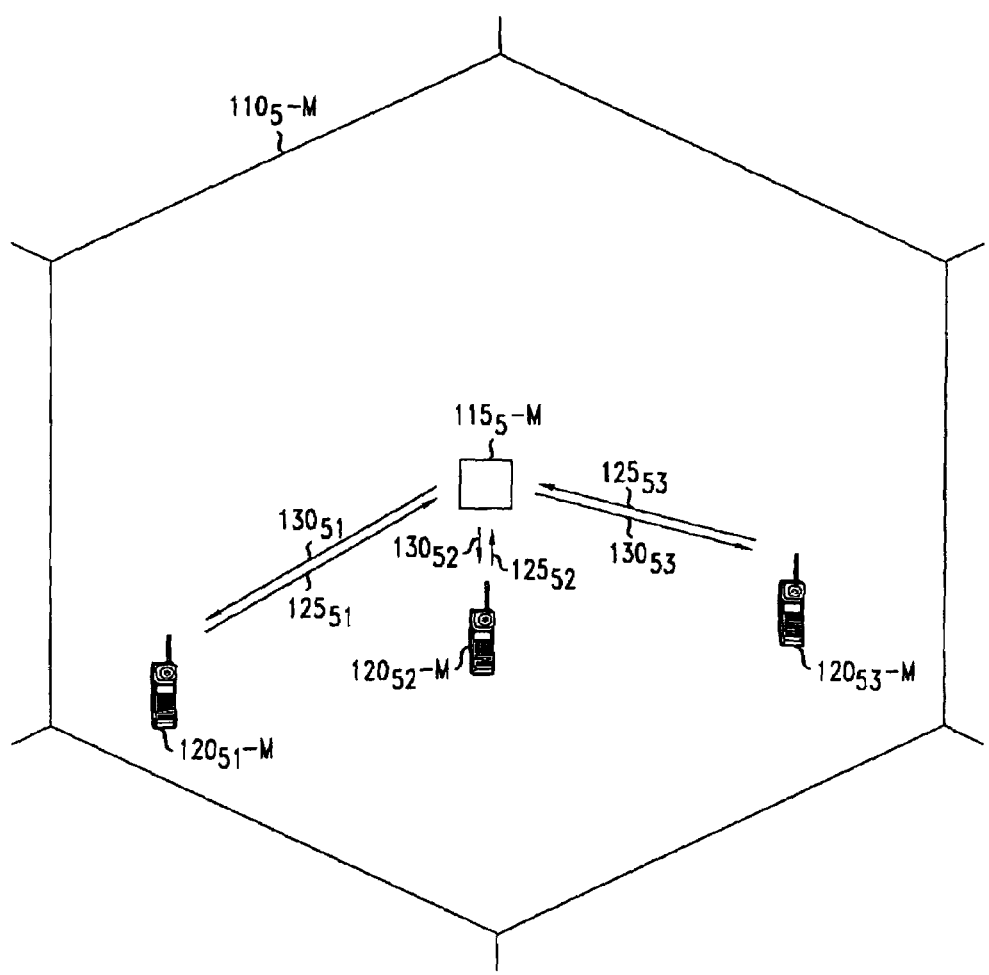
FIG. 2a illustrates in more detail a cell of the wireless communication system of FIG. 1 when multi-user detection is used to compensate for interference among signals within the cell.

FIG. 2a illustrates cell $110_5$ of wireless communication system 100 when multi-user detection is used to compensate for interference among signals within the cell. The cell is represented by $110_5$-M, with M used throughout the description and figures to represent that multi-user detection is used.

Cell $110_5$-M includes base station $115_5$-M that communicates with mobile terminals $120_{51}$-M, $120_{52}$-M, and $120_{53}$-M over an uplink and a downlink. The uplink includes communication channels for transmitting signals $125_{51}$, $125_{52}$, and $125_{53}$—commonly referred to as uplink signals—from mobile terminals $120_{51}$-M, $120_{52}$-M, and $120_{53}$-M, respectively, to base station $115_5$-M. The downlink includes communication channels for transmitting signals $130_{51}$, $130_{52}$, and $130_{53}$—commonly referred to as downlink signals—from base station $115_5$-M to mobile terminals $120_{51}$-M, $120_{52}$-M, and $120_{53}$-M, respectively. Multi-user detection can be used on either the uplink, or the downlink, or both.

As can be seen in FIG. 2a, base station $115_5$-M receives a received signal that includes all three uplink signals $125_{51}$, $125_{S2}$, and $125_{S3}$. Because these signals scatter off of objects in the environment and because they have a wide angle of propagation, typically somewhere between 60° and 360°, these signals interfere with one another, thereby negatively affecting the ability of base station $115_5$-M to use the received signal to accurately decode uplink signals $125_{S1}$, $125_{S2}$, and $125_{S3}$. Multi-user detection can be used to compensate for some of such interference. To use multi-user detection the base station should decode these received signals in an order. The base station then can either 1) determine the theoretical highest system throughput when multi-user detection uses this order, as in the prior art, and assign the data rates and/or power levels based on this calculation or 2) use multi-user detection using this order and determine the data rates and/or power levels assigned to the mobile terminals based on the requirements of the mobile terminals without regard to the interference introduced by the terminals having a higher index in the order, as described in more detail below.

In the illustrative embodiment, the order of the signals is $125_{S1}$ first (it will not be interfered with by signals $125_{S2}$ and $125_{S3}$), signal $125_{S2}$ second (it can be interfered with by signal $125_{S1}$, but it will not be interfered with by signal $125_{S3}$), and signal $125_{S3}$ third (it can be interfered with by both $125_{S1}$ and $125_{S2}$). Thus, base station $115_5$-M will decode signal $125_{S3}$ first, signal $125_{S2}$ second, and signal $125_{S1}$ third. By transmitting signal $125_{S3}$ at a low enough data rate and/or at a high enough power level, signal $125_{S3}$ can be decoded even in the presence of signals $125_{S1}$ and $125_{S2}$. Once signal $125_{S3}$ is decoded, then the decoded signal is used to reconstruct signal $125_{S3}$. Signal $125_{S3}$ is reconstructed into the form in which it was received by base station $115_5$-M. Typically, the signal is reconstructed by first encoding the decoded signal using the coding techniques used to originally encode the signal at the transmitter, and then adjusting this signal to reflect the effect that the channel between the mobile terminal and the base station had on the signal. The latter is accomplished using the channel characteristics of this channel. (Note, the channel characterizations are typically determined by the receiver prior to the start of the data bursts that make up the communications. After receiver determines them it transmits the channel characterization to transmitter. In some cases, for example, so-called time duplexed communication, the transmitter can determine the channel characteristics prior to the start of the data bursts.)

The reconstructed signal is then subtracted from the received signal. This reduces the effect of interference for the remaining signals, i.e. $125_{S1}$ and $125_{S2}$, since once signal $125_{S3}$ is subtracted it is effectively no longer interference for these other signals. Thus, the next signal to be decoded, signal $125_{S2}$ can be sent at a higher data rate and/or a lower power level than if there was no such interference compensation, and still be decoded with an acceptable error rate. This is because when signal $125_{S3}$ is subtracted out, the interference from this signal to signal $125_{S2}$ is eliminated, or at least substantially reduced. The present inventors have realized that to the extent that mobile terminal $120_{S3}$'s signal is taken account of in mobile terminal $120_{S2}$'s signals, it is as though the former does not exist from the latter's standpoint and, as such, mobile terminal $120_{S3}$ is a "phantom" to mobile terminal $120_{S2}$.

FIG. 3 illustrates, for the cell shown in FIG. 2a, which mobile terminals' signals are taken account of in compensating for interference in which other mobile terminals' signals, that is, which mobile terminals are phantoms to which other mobile terminals.

Once signal $125_{S2}$ is decoded the decoded signal is used to reconstruct signal $125_{S2}$ into the form in which it was received by base station $115_5$-M. The reconstructed signal is then subtracted from the received signal. This further reduces the interference for remaining signal $125_{S1}$, since once signals $125_{S2}$ and $125_{S3}$ are subtracted from the received signal they no longer interfere with signal $125_{S1}$. Thus, signal $125_{S1}$ can be sent at higher data rate and/or a lower power level than if there was no such interference compensation, and still be decoded with an acceptable error rate. So, both mobile terminals $120_{S2}$'s and $120_{S3}$'s signals are compensated for in mobile terminal $120_{S1}$'s signal. So, as shown in FIG. 3, mobile terminals $120_{S2}$ and $120_{S3}$ are phantoms to mobile terminal $120_{S1}$.

As can be seen from the description above, multi-user detection can be used on the uplink to allow signals to be transmitted within the system at, for example, increased data rates and/or at lower power levels, without increasing the error rates. This increases the overall system throughput, i.e., the rate of communication traffic the system can handle at any given time.

Furthermore, in addition to being able to transmit a particular signal at higher data rate and/or a lower power level, because the communications between the base stations and mobile terminals are suffering less interference, the reduced interference could allow additional mobile terminals to be able to communicate with the base station.

However, on the downlink, particularly when the base station and mobile terminals communicate using more than one antenna, multi-user detection is not very effective in increasing the overall system throughput. In particular, similarly to the uplink signals, the downlink signals scatter off of objects in the environment and have a wide angle of propagation. Thus, these signals interfere with one another. Although, a particular mobile terminal may receive many of the downlink signals for communication with other mobile terminals, these signals are typically not received at power levels that allow the particular mobile terminal to detect them and to decode them acceptably enough to be able to subtract them out. Thus, at some mobile terminals multi-user detection can be used to compensate for only a few of the interfering signals that impinge upon it, and at other mobile terminals multi-user detection cannot be used at all on the downlink.

Figure 2B:
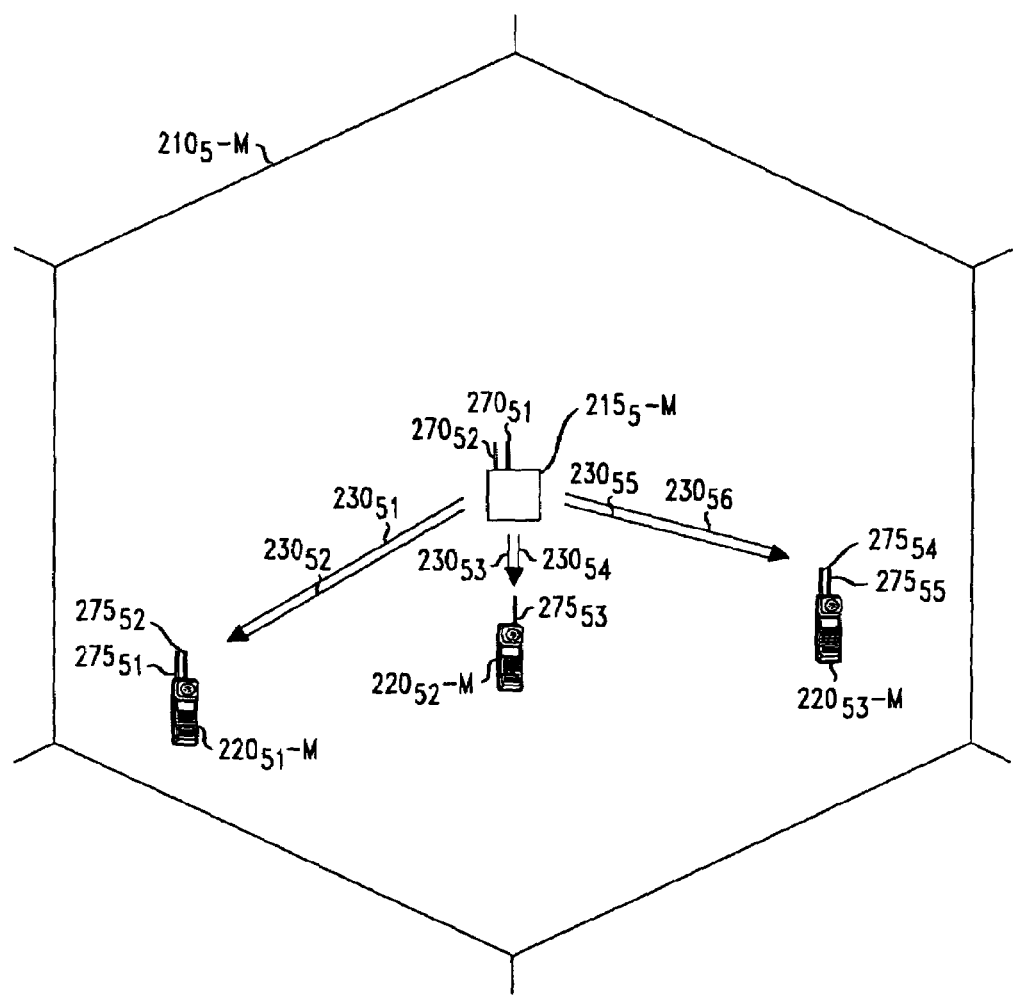
FIG. 2b illustrates in more detail a cell of the wireless communication system of FIG. 1 when multi-user detection is used to compensate for interference among signals within the cell, and where the base station and at least some of the mobile terminals communicate using multiple antennas.

Additionally, when, as shown in FIG. 2b, base station $215_5$-M communicates with mobile terminals $220_{S1}$-M, $220_{S2}$-M, and $220_{S3}$-M using multiple antennas, then it is particularly difficult, or even impossible, to detect the signals meant for other mobile terminals. Cell $210_5$-M of FIG. 2b is similar to cell $110_5$-M of FIG. 2a, except the base station and/or some of the mobile terminals of cell $210_5$-M have multiple transmit and/or receive antennas. Cell $210_5$-M can be used in wireless communication system 100 instead of cell $110_5$-M. Cell $210_5$-M includes base station $215_5$-M, which has two transmit/receive antennas $270_{S1}$ and $270_{S2}$; mobile terminals $220_{S1}$-M and $220_{S3}$-M, which have two transmit/receive antennas $275_{S1}$ and $275_{S2}$, and $275_{S4}$ and $270_{S5}$, respectively; and mobile terminal $220_{S2}$, which has one transmit/receive antenna $275_{S3}$. Each of the base station antennas $270_{S1}$ and $270_{S2}$ transmits a downlink signal to each of the mobile terminals. Thus, antennas $270_{S1}$ and $270_{S2}$ transmit signals $230_{S1}$ and $230_{S2}$ to mobile terminal $220_{S1}$-M, signals $230_{S3}$ and $230_{S4}$ to mobile terminal $220_{S2}$-M, and signals $230_{S5}$ and $230_{S6}$ to mobile terminal $220_{S3}$-M. Each of the signals transmitted to a particular mobile terminal is received by each of its antennas. Additionally, some, or even all of the signals transmitted to the other mobile terminals are received by each of the particular mobile terminal's antennas. For example, signals $230_{55}$ and $230_{56}$, transmitted to mobile terminal $220_{53}$-M, are transmitted at a power level and rate that will allow this mobile terminal to detect the signals considering the channel characteristics between the transmit and receive antennas ($270_{51}$ and $270_{52}$, and $275_{55}$ and $275_{56}$, respectively) and the number of antennas at the transmitter (in this case base station $215_5$-M) and the receiver (in this case mobile terminal $220_{53}$-M). However, the signals transmitted to the other mobile terminals are transmitted at a power level and data rate that will allow those other mobile terminals to detect them, but not necessarily for mobile terminal $220_{53}$-M to detect them. Due to the fact that the channel characteristics and interference are used to determine power levels/data rates for one set of antennas to be able to receive a signal, and the fact that the channel characteristics and interference are different for different sets of antenna, it is often unlikely that a signal that is sent at a power level/data rate that will allow it to be received by one set of antennas at one mobile terminal will also allow it to be received at an acceptable power level/data rate to decode at a different set of antennas that are at a different mobile terminal. Thus, it is highly unlikely that mobile terminal $220_{53}$-M will be able to detect signals $230_{51}$, $230_{52}$, or $230_{53}$ that are transmitted to other mobile terminals. Thus, mobile terminal $220_{53}$-M will not be able to subtract out these signals, and so multi-user detection cannot be effectively used on the downlink to mobile terminal $220_{53}$-M. Similarly, multi-user detection cannot be used on the downlink to mobile terminals $220_{51}$-M and $220_{52}$-M.

It is thus seen, as indicated earlier, that multi-user detection is quite effective on the uplink in increasing the overall system throughput, while on the downlink multi-user detection is less effective in doing so.

As described above, dirty paper coding often provides better interference reduction on the downlink. As is explained in more detail with reference to FIG. 4a, dirty paper coding compensates for interference by adjusting a signal, before it is transmitted, to take into account some of the interference the signal will encounter after it is transmitted. For further information on the operation and use of dirty paper coding see, for example, M. Costa, "Writing on Dirty paper", IEEE Transactions on Information Theory, Vol. 29, No. 3, pp. 439, 1983 (Appendix A); and U. Erez, S. Shamai, R. Zamir, "Capacity and Lattice-Strategies for Canceling Known Interference", ISIS, Honolulu Hi., USA, Nov. 5–8, 2000, both incorporated herein by this reference.

Figure 4A:
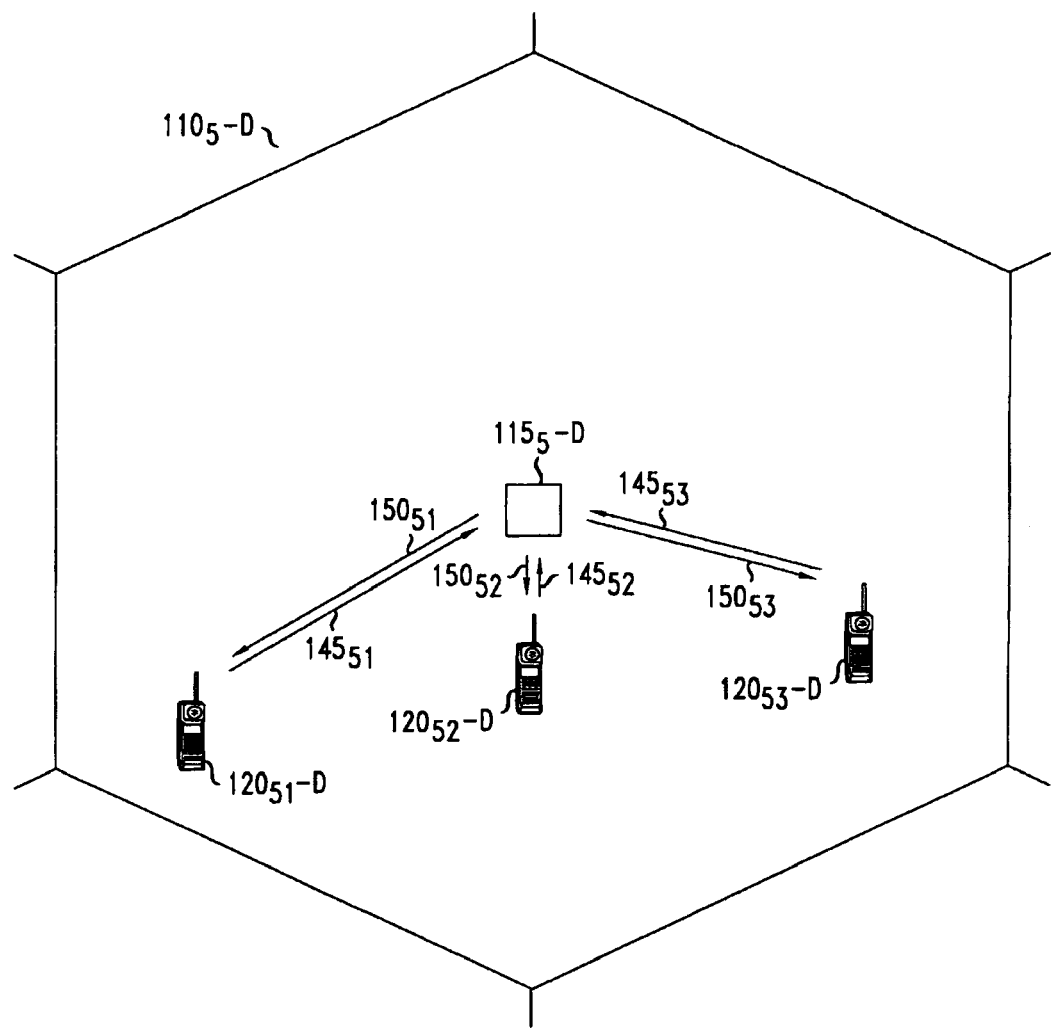
FIG. 4a illustrates in more detail a cell of the wireless communication system of FIG. 1 when dirty paper coding is used to compensate for interference among signals within the cell.

FIG. 4a illustrates in more detail cell $110_5$ of wireless communication system 100 when dirty paper coding is used to compensate for interference among signals within the cell. The cell is represented by $110_5$-D, with D used throughout the description and figures to represent that dirty paper coding is used. Similarly to cell $110_5$-M, cell $110_5$-D includes base station $115_5$-D that communicates with mobile terminals $120_{51}$-D, $120_{52}$-D, and $120_{53}$-D via uplink signals $145_{51}$, $145_{52}$, and $145_{53}$ and downlink signals $150_5$, $150_{52}$, and $150_{53}$.

On the downlink, each mobile terminal $120_{51}$-D, $120_{52}$-D, and $120_{53}$-D receives all of the downlink signals $150_{51}$, $150_{52}$, and $150_{53}$ transmitted by base station $115_5$-D and needs to decode the particular signal directed to it. These signals interfere with one another, thereby negatively affecting the ability of the mobile terminals to accurately decode the signal directed to the mobile terminals. Dirty paper coding can be used to compensate for some of such interference. To use dirty paper coding, base station $115_5$-D should impose some sort of order on the mobile terminals before it transmits the signals to the terminal. The order determines who is being interfered with by whom. The base station then can either 1) determine the theoretical highest system throughput when dirty-paper coding uses this order, as in the prior art, and assign data rates and/or power covariance matrices based on this calculation, or 2) use dirty paper coding using this order and determine the data rates and/or power levels assigned to the mobile terminals based on the requirements of the mobile terminals without regard to the interference introduced by the terminals having a higher index in the order, as described in more detail below.

In the illustrative embodiment, the order imposed is mobile terminal $120_{51}$ first, mobile terminal $120_{52}$ second, and mobile terminal $120_{53}$ third. Mobile terminals $120_{51}$ will suffer no interference from $120_{52}$ and $120_{53}$. Mobile terminal $120_{52}$ will suffer no inference from $120_{53}$ and can suffer interference from $120_{51}$. Mobile terminal $120_{53}$ can suffer interference from both $120_{51}$ and $120_{52}$. Signals $150_{51}$, $150_{52}$, and $150_{53}$ are typically multi-dimensional. A simple explanation of dirty paper coding with one dimensional symbols is now provided with reference to FIGS. 4a and 4b, one skilled in the art can use this explanation and the reference cited above to implement dirty paper coding with multi-dimensional symbols. (Note, the signals are typically multi-dimensional due to the time coding of these signals prior to transmission and to the plurality of antennas used to transmit and/or receive them). At a particular time the mobile terminal whose interference is being compensated for (removed) is used, as described below, to adjust the signal from the mobile terminal being interfered with. If there is more than one mobile terminal whose interference is being compensated for, then the signals of the mobile terminal with the last index order (in this case three) is used to adjust the signal of the mobile terminal with the second to last index order (in this case two). This adjusted signal is then used to adjust the signal of the mobile terminal with the third to last index order, and so on until the signal of the mobile terminal with order of one is so adjusted.

Figure 4B:
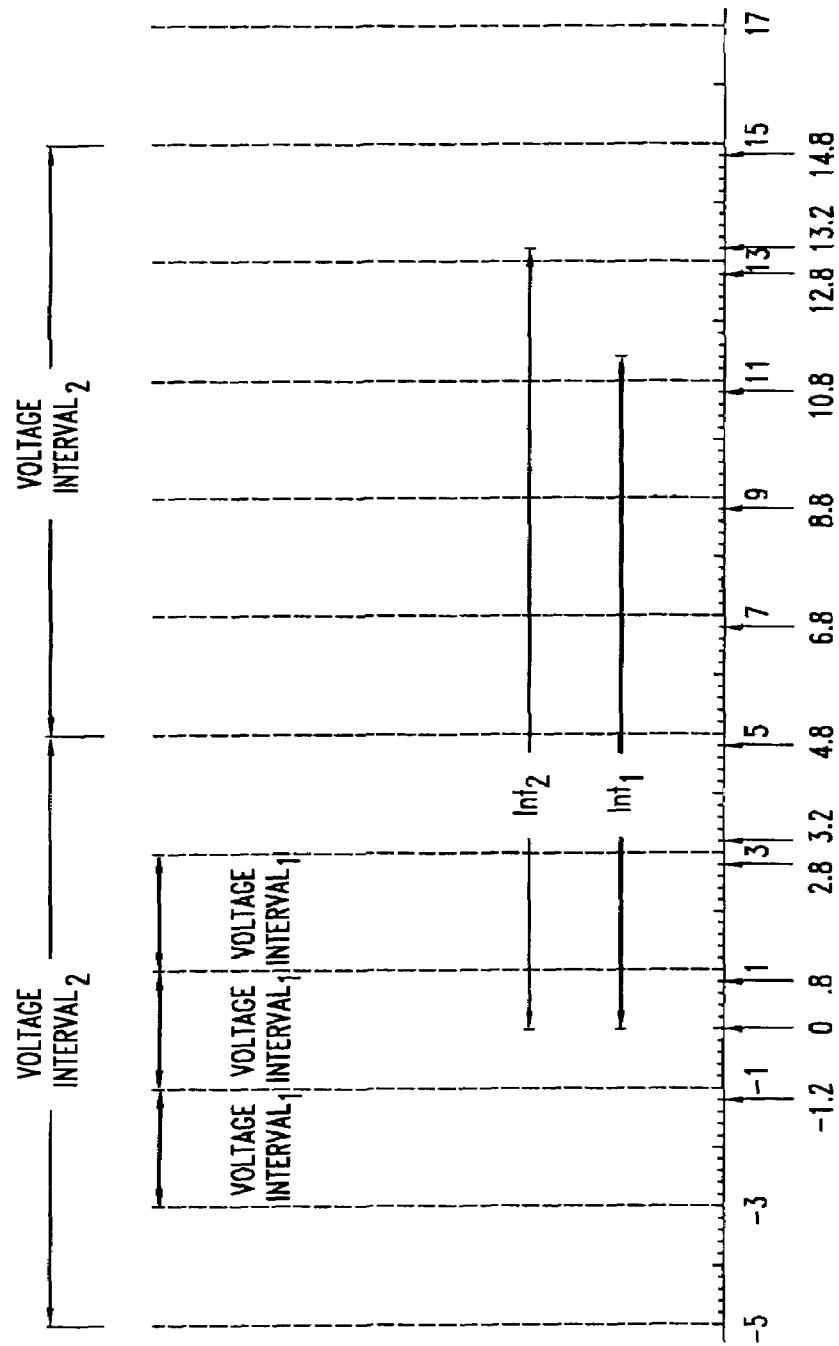
FIG. 4b illustrates a plurality of voltage intervals used for explaining a simple version of dirty paper coding.

The way the signals are transmitted is now first explained without the use dirty paper coding, and then with its use. At a particular time each signal is transmitted using a voltage within a voltage interval. The voltage intervals are ranges of voltages, some of which are shown in FIG. 4b. The voltage intervals are different for the different mobile terminals. For example, the voltage intervals for $150_{52}$ are 10 V apart, such as −5V to 5V, 5V to 15V, 15 to 25, etc, and for $150_{51}$ are 2 V apart, such as −1V to 1V, 1V to 3V, 3 to 5, etc. Each of the voltage intervals includes a discrete number of voltages, each of which is mapped to a particular binary number. The discrete voltages in same location within each of the voltage intervals for the same mobile terminal correspond to the same binary number. For example, for the 10 V intervals (voltage intervals$_2$) −6.8V, 3.2V, and 13.2V are all mapped to the same binary number. For the 2V intervals (voltage intervals$_1$) −3.2V, −1.2V, 0.8V, 2.8V, 4.8V, 6.8V, 8.8V, 10.8V, 12.8V, 14.8V, and 16.8 are all mapped to the same binary number. If $150_{51}$ is 0.8, $150_{52}$ is 3.2V, and $150_{53}$ is 11.4V, then without the use of dirty paper, base station $115_5$-D would transmit a transmit signal that included each of signals $150_{51}$, $150_{52}$, and $150_{53}$, typically with each signal at a different data rate or power level, and these signals would interfere with each other.

With the use of dirty paper coding the transmit signal is obtained in the following way. First signal $150_{52}$ is compensated for the interference of signal $150_{53}$. Int$_1$ shows the amount of interference provided by signal $150_{53}$, in order to eliminate this interference for signal $150_{s2}$, yet not completely eliminate signal $150_{s3}$, determine using the intervals related to $150_{s2}$, i.e. voltage intervals$_2$, the closest discrete voltage to the voltage of signal $150_{s3}$, i.e. 11.4V that corresponds to the same binary number as the voltage of signal $150_{s2}$, i.e. 3.2V. In this case the closest binary voltages to 11.4V that correspond to the same binary number as 3.2V are 3.2V and 13.2V. 13.2V is closer to 11.4V than 3.2V is to 11.4V. Thus, 13.2V represents the compensated signal $150_{s2}$, that is, signal $150_{s2}$ compensated for signal $150_{s3}$.

If the only two signals in cell $110_s$-D were $150_{s2}$ and $150_{s3}$ then 13.2V could be transmitted and both mobile terminals $120_{s2}$-D and $120_{s3}$-D would be able to decode their signals.

Compensated signal $150_{s2}$ is then used to compensate signal $150_{s1}$. Int$_2$ shows the amount of interference provided by compensated signal $150_{s2}$, in order to eliminate this interference for signal $150_{s1}$, yet not completely eliminate signal $150_{s2}$, determine the closest discrete voltage (using the intervals related to $150_{s1}$, that is voltage intervals$_1$) to the voltage of compensated signal $150_{s2}$, i.e. 13.2V that corresponds to the same binary number as the voltage of signal $150_{s1}$, i.e. 0.8V. In this case the closest binary voltages to 13.2V that correspond to the same binary number as 0.8V are 14.8V and 12.8V. 12.8V is closer to 13.2V than 14.8V is to 13.2V. Thus, 12.8V represents the compensated signal $150_{s1}$, that is, signal $150_{s1}$ compensated for signals $150_{s2}$ and $150_{s3}$. Therefore, 12.8V is the transmitted signal.

Thus, mobile terminal $120_{s3}$'s signals are taken account of in mobile terminal $120_{s2}$'s signal, so mobile terminal $120_{s3}$ is a phantom to mobile terminal $120_{s2}$. And both mobile terminals $120_{s2}$'s and $120_{s2}$'s signals are taken account of in mobile terminal $120_{s1}$'s signals, so mobile terminals $120_{s2}$ and $120_{s3}$ are phantoms to mobile terminal $120_{s1}$.

In the multi-dimensional symbol context the voltages transmitted are actually voltage vectors, the interference voltage is a vector, and the voltage interval is a voltage lattice component.

Although, the prior art discusses dirty paper coding, the present inventors are not aware of the art discussing using dirty paper coding on the uplink, nor of what is to be used on the uplink when dirty paper coding is used on the downlink. In order to use dirty paper coding on the uplink the signals from all of mobile terminals $120_{s1}$-D, $120_{s2}$-D, and $120_{s3}$-D have to be somehow passed to one transmitter that would transmit them to the base station. This is quite difficult to implement. Indeed it is currently impractical. Furthermore, even if it was implementable, as the present inventors have realized as can be seen from our above explanations of dirty paper, dirty paper coding is more computationally burdensome, and thus requires more processing power, than multi-user detection.

As described above, dirty paper coding provides a better interference reduction on the downlink than multi-user detection. However, as also described above, dirty paper coding is not currently practical on the uplink. The present inventors have thus realized that it is advantageous to use dirty paper coding on downlink signals and multi-user detection on uplink signals.

Figure 5:
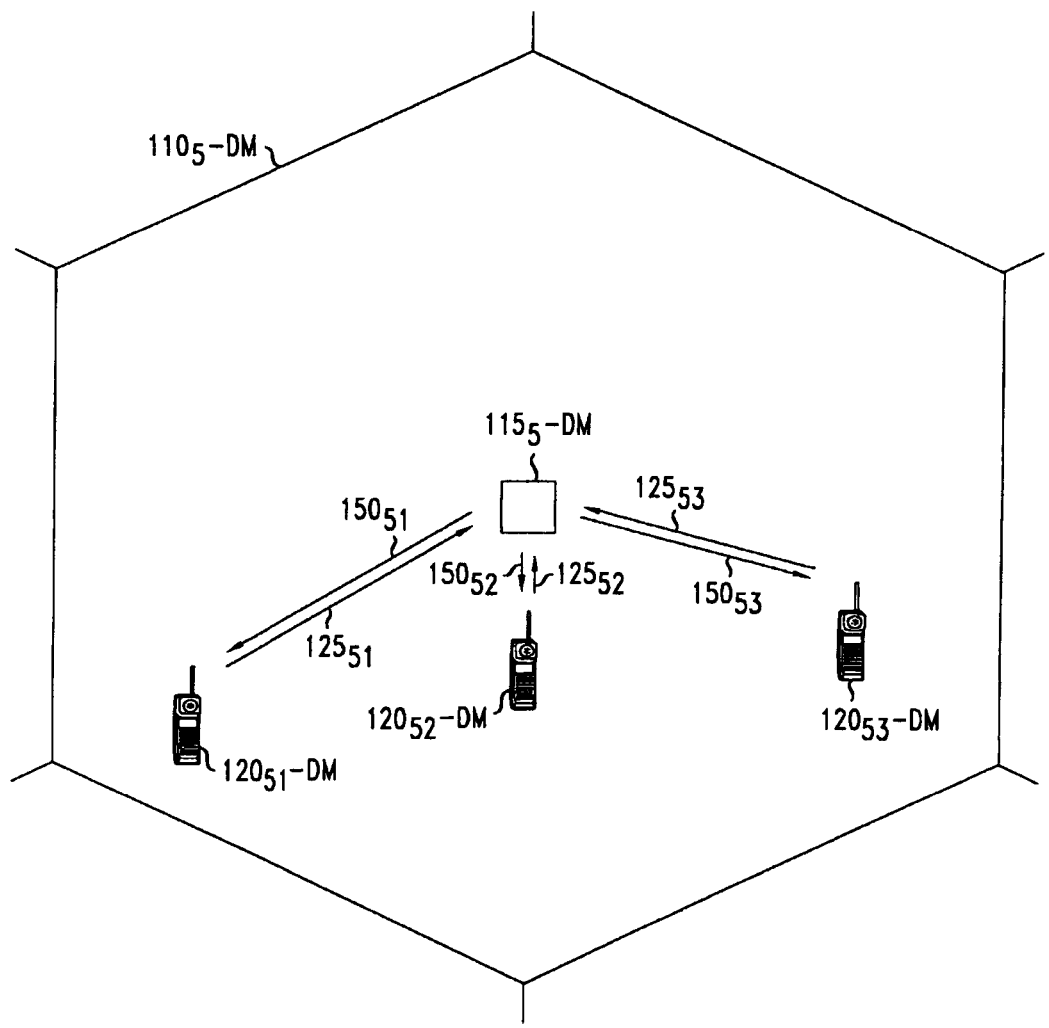
FIG. 5 illustrates in more detail a cell of the wireless communication system of FIG. 1 when dirty paper coding is used on the downlink and multi-user detection is used on the uplink in accordance with an embodiment of the invention.

FIG. 5 illustrates in more detail cell $110_5$ of wireless communication system 100 when dirty paper coding is used on the downlink and multi-user detection is used on the uplink. The cell is represented by $110_5$-DM, with DM used throughout the description and figures to represent that dirty paper coding is used on the downlink and multi-user detection is used on the uplink.

Similarly to cells $110_5$-M and $110_5$-D, cell $110_5$-DM includes base station $115_5$-DM that communicates with mobile terminals $120_{s1}$-DM, $120_{s2}$-DM, and $120_{s3}$-DM via uplink signals $125_{s1}$, $125_{s2}$, and $125_{s3}$ and downlink signals $150_{s1}$, $150_{s2}$, and $150_{s3}$. In this scenario the uplink operates as described above with reference to the uplink for multi-user detection and the downlink operates as described above with reference to the downlink for dirty paper coding.

Using dirty paper coding on downlink signals and multi-user detection on uplink signals, in accordance with co-pending U.S. patent application Ser. No. 10/005,506 filed concurrently herewith by Foschini et al., and assigned to the assignee hereof, entitled "Wireless Communication System With Interference Compensation", and incorporated herein by this reference, advantageously provides greater interference reduction than if multi-user detection was used on both links, while is easier to implement and engendering less processing than if dirty paper coding was used on both links.

Additionally, as the present inventors have realized, that it is desirable to compensate particular terminals' signals for interference from other terminal's signals, and thus allow some mobile terminals to be phantoms to other mobile terminal. Particularly, the present inventors have realized that it would be desirable to have a system that provides a readily implementable system where on both links mobile terminals are phantoms to each other, referred to herein as a "phantom net" system. As described above, the present inventors have also realized that such a phantom net system can be achieved on the uplink and the downlink on a predictable basis by using multi-user detection on the uplink and dirty paper coding on the downlink. Therefore, the present invention provides an implementable system where on both links mobile terminals are phantoms to each other. Furthermore, in accordance with the present invention, at least one mobile terminal will be compensated for the interference from all other mobile terminals on the uplink. Similarly, at least one mobile terminal, not necessarily the same one as on the downlink, will be so compensated on the downlink. Thus, all of the mobile terminals (except the terminal that has an index of one) in a particular portion of wireless system 100 will be phantoms to at least one mobile terminal.

Operating Parameter Assignment.

As discussed above, a problem arises because of the way in which in the disclosures of dirty paper coding and multi-user detection (which are largely theoretical in nature) assign the data rate (or set of data rates) and/or power covariance matrices to each mobile terminal. Typically, data rate and/or power covariance matrices is assigned based on the theoretical highest system throughput that can be achieved using the particular compensation technique at a particular instant in time given the conditions that then exist. (The theoretical highest system throughput refers to the maxim theoretically obtainable throughput for the system or for the portion of the system being considered and not to the throughput of the individual mobile terminals.) The conditions are typically, e.g., the number of terminals and their channel characteristics, the uplink and downlink transmit power levels, etc. There may also be discussions assigning data rate and/or power covariance matrices based on weighted theoretical highest system capacity, which determines the theoretical highest system capacity when certain mobile terminals' rates are weighted. The weighting can be, for example, the revenue per bit per second associated with the mobile terminal. Some of the theoretical calculations are described in, for example, S. Verdu, MULTI USER DETECTION, (cited above) for multi-user detection; and in for example M. Costa, "Writing on Dirty paper", (cited above), U. Erez, S. Shamai, R. Zamir, "Capacity and Lattice-Strategies for Canceling Known Interference" (cited above), and S. Vishwanath, N. Jindal, and A. Goldsmith "On the Capacity of Multiuple Input Multiple Output Broadcast Channels" Department of Electrical Engineering, Stanford University, Stanford, Calif. 94305 http://wsl.stanford.edu/ for dirty paper coding.

The present inventors have realized that it is advantageous to assign an operating parameter, such as the data rate, the power level, the power covariance matrix, or the set of data rates, to the mobile terminals without determining the maximal system throughput, and without determining the maximal weighted system throughput. This can be accomplished by imposing an order on the terminals and assigning the operating parameter such that at least one of operating parameter values of terminals that have a lower index in the order will not be made worse due to the presence of terminals having a higher index in the order. (Making an operating parameter value worse means reducing the efficacy of the communication, for example, for data rate reduced efficacy means a reduced data rate, and for power level reduced efficacy means an increased power level.) The operating parameter values are assigned to the terminals in the order.

The above means that the data rate and/or power covariance matrices are assigned such that the data rates of the terminals having a lower index in the order will not be decreased due to the presence of the terminals having a higher index in the order, and this is accomplished without changing the power covariance matrices of the antennas involved in the communication with the lower indexed terminals. (Note a mobile terminals index in the order is its order number, so a mobile terminal that is first in the order has the lowest order index, of one; and a mobile terminal that is second in the order has an index of two, and thus has a higher index in the order than the mobile terminal whose index is one.) The compensation scheme (such as dirty paper coding or multi-user detection) is used to compensate for interference among the signals. The compensation performed using an order of the terminals that defines which terminals' signals are used to compensate for interference in which other terminals' signals. So, the assignment is made to the terminals based on the terminals requirements without regard to the interference introduced by the terminals lower in the order since this interference will be compensated for by the compensation technique when the compensation technique process the terminals in accordance with the order. Assigning the data rate and/or power level to the mobile terminals without determining the maximal system throughput, and without determining the maximal weighted system throughput is in marked contrast to the prior art approach in which at least one of the above is maximized through complex calculations. Thus, the invention reduces the amount of computation necessary to implement such techniques on an ongoing, real-time basis in a real-world system.

Figure 6:
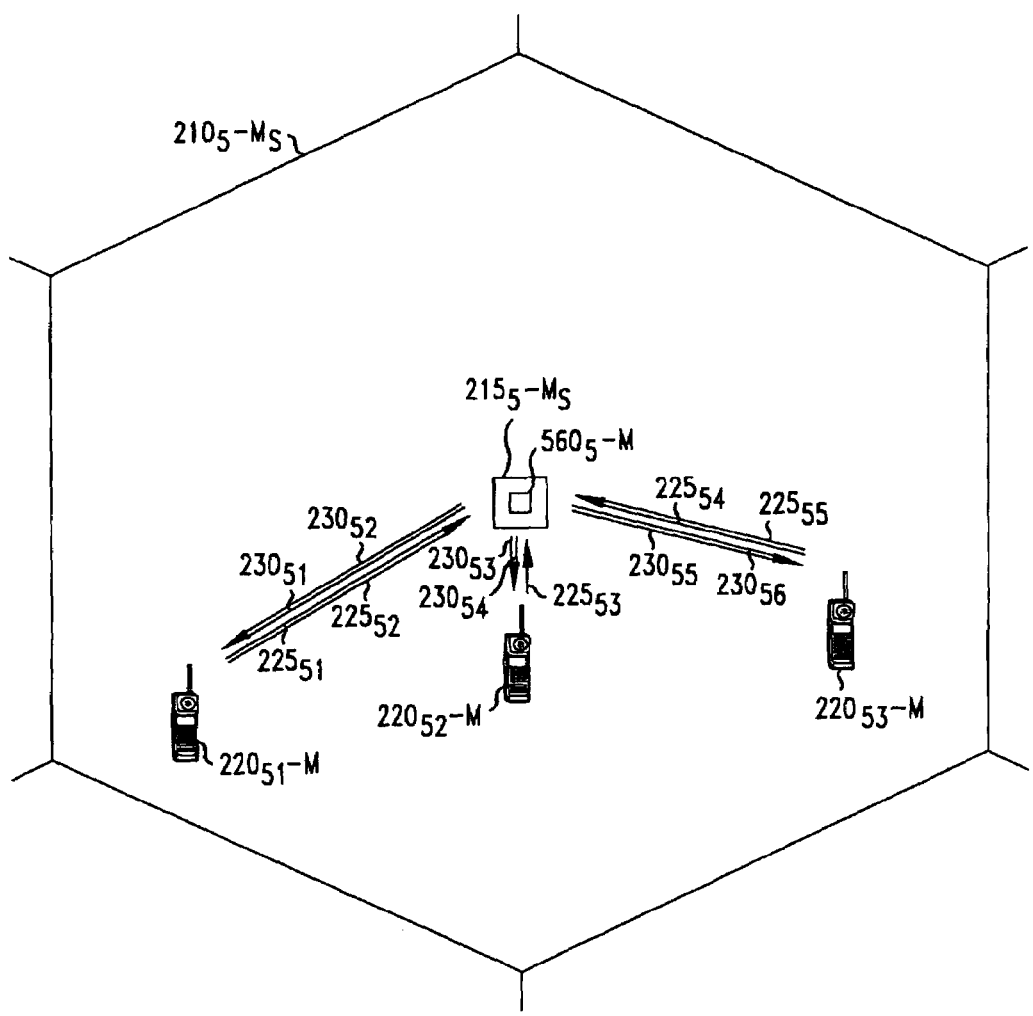
FIG. 6 illustrates in more detail a cell of the wireless communication system of FIG. 1 when an order is imposed on the mobile terminals in the cell, pursuant to the principles of the invention, and multi-user detection is used to compensate for interference among signals within the cell.

FIG. 6 illustrates in more detail cell $210_5$ when the order is imposed on the mobile terminals in the cell, pursuant to the principles of the invention, and multi-user detection is used to compensate for interference among signals within the cell. The cell shown in FIG. 6 being represented by $210_5\text{-}M_S$, with $M_S$ used throughout the description and figures to represent that multi-user detection with order is used.

As described above, with reference to FIG. 2a, cell $110_5$-M can operate 1) using the assignment of data rates/ power levels based on the highest obtainable system throughput for this particular system when multi-user detection uses this order or 2) using multi-user detection that uses this order and determining the data rates and/or power levels assigned to the mobile terminals based on the requirements of the mobile terminals without regard to the interference introduced by the terminals having a higher index in the order, and without the determination of the highest system throughput, in accordance with the invention. Cell $210_5\text{-}M_S$, shown in FIG. 6, is the version of cell $110_5$-M that does not determine the highest system throughput and in which the base station and/or some of the mobile terminals have multiple transmit and/or receive antennas. Cell $210_5$-M can be used in wireless communication system 100 instead of cell $110_5$.

In one embodiment of the invention, the order used in cell $210_5\text{-}M_S$ is determined by processor $560_5$-M of base station $115_5\text{-}M_S$. In other embodiments of the invention the order can be determined at any processor, controller, or other equipment within wireless system 100, such as for example the Mobile Switching Center (MSC). The order can then be passed to base station $115_5\text{-}M_S$.

The order can be determined randomly or, alternatively, the order can be based on some predefined criterion or criteria that may prove advantageous in using as much system capacity as possible without actually having to calculate the theoretically highest system throughput. For example, the order can be based on the order in which the mobile terminals initiated a communication session with the base station(s) (either ascending or descending); the order might be based on the amount of data to be transmitted to or from the various mobile terminals; or the order might be based on which mobile terminal could make best use of the communication resources on an individual basis (as opposed to the overall basis used in the prior art calculations). Maximizing a performance criteria can be, for example, by determining which mobile terminal achieves a required rate with least power when the determination is made for each mobile terminal assuming an absence of the other mobile terminals in the system. The mobile terminal that achieves this required rate with the least power is given the index in the order of one. This is then repeated for the remaining mobile terminals, except the assumption now is that they are interfered with by mobile terminals that have already been assigned on index in the order but not interfered by the mobile terminals that have not been assigned an index. The last step is repeated until all of the mobile terminals are assigned an order. Alternatively, maximizing a performance criteria can be, for example, achieving a maximum rate at specified power level per user.

In the illustrative embodiment, for example, the order is based on the order in which mobile terminals initiated a communication session with the base station. If mobile terminal $220_{51}$ initiated a communication session with base station $215_5\text{-}M_S$ first, mobile terminal $220_{52}$ second, and mobile terminal $220_{53}$ third, then the order of the mobile terminals is $220_{51}$ first, $220_{52}$ second, and $220_{53}$ third. So, base station $215_5$-M will decode signals $225_{54}$ and $225_{55}$ first, signal $225_{53}$ second, and signals $225_{51}$, $225_{52}$ third. This order means that on the uplink mobile terminals $220_{52}$ and $220_{53}$ are phantoms to mobile terminal $220_{51}$, and mobile terminal $220_{53}$ is a phantom to mobile terminal $220_{52}$. Note, that the signals from the same mobile terminal, even when there are several signals from the same mobile terminal, count as only one element in the scheme of the order, there can be exceptions when the signal are carrying files that have different performance needs.

Because mobile terminals $220_{52}$ and $220_{53}$ are phantoms to mobile terminal $220_{51}$, the signals of mobile terminals $220_{52}$ and $220_{53}$ do not interfere with the signals of mobile terminal $220_{51}$, so the signals to mobile terminal $220_{51}$ can be assigned a data rate and a power level based on its requirements without consideration of the signal to mobile terminals $220_{52}$ and $220_{53}$ and without consideration of the highest obtainable system throughput. So, for example, if mobile terminal $220_{51}$ is constrained to a certain power level, then mobile terminal $220_{51}$ gets the highest data rate that can be supported at this power level considering that the signals to mobile terminal $220_{51}$ are not interfered with by the signals to mobile terminals $220_{52}$ and $220_{53}$. This highest data rate can be determined using well-known techniques such as water pouring. Water pouring selects the power allotments used at the virtual antenna at various frequencies, for further information on water pouring see for example, J. J. Raleigh, and J. M. Cioffi "Spacial-Temporal Coding for Wireless Communication" IEEE Transaction on Communications, Vo. 46 March 1998, p. 357, R. R. Farrokhi, G. J, Foschini, R. A. Valenzuela "Link-Optimal Space-Time Processing with Multiple Transmit and Receive Antennas" IEEE Communications Letters, Vol. 5, No. 3 March 2001, p. 85, both incorporated herein by this reference.

And, if mobile terminal $220_{51}$ requires certain a data rate, then mobile terminal $220_{51}$ gets the lowest power level needed to support this power level considering that the signals to mobile terminal $220_{51}$ are not interfered with by the signals to mobile terminals $220_{52}$ and $220_{53}$. This lowest power level can be determined using well-known techniques such as water pouring.

Similarly because mobile terminal $220_{53}$ is a phantom to mobile terminal $220_{52}$, mobile terminal $220_{52}$ can be assigned a data rate and/or power level based on its requirements without consideration of the signal to mobile terminal $220_{53}$ and without consideration of the highest obtainable system throughput.

On the uplink, cell $210_S$-$M_S$ operates similarly to cell $210_S$-M, described above with reference to FIG. 2a, except to detect the signals the base station has to use techniques used to detect signals in multiple antenna environments. Such techniques are, for example, water pouring in the presence of interference, discussed in, for example, the J. J. Raleigh, and J. M. Cioffi "Spacial-Temporal Coding for Wireless Communication" reference, and the R. R. Farrokhi, G. J, Foschini, R. A. Valenzuela "Link-Optimal Space-Time Processing with Multiple Transmit and Receive Antennas" reference.

Thus, the data rate and/or power level is assigned to the mobile terminals without determining the maximal system throughput, and without determining the maximal weighted system throughput. Additionally, the data rate and/or power level are assigned such that the data rates of the terminals having a lower index in the order will not be decreased due to the presence of the terminals having a higher index in the order, and this is accomplished without changing the power covariance matrixes of the antennas involved in the communication with the lower indexed terminals.

Although, the order can be imposed on the uplink, the downlink, or both, when multi-user detection is used on both the uplink and the downlink, it may be beneficial to impose the order on just the uplink. It may not be beneficial to impose the order on the downlink when multi-user detection is used on the downlink, since, as described above, on the downlink each mobile terminal may not be able to decode the downlink signals for communication with other mobile terminals. Thus, the mobile terminal may not be able to decode the signals in the order. Furthermore, because of the power level with which a particular mobile terminal receives all of the downlink signals it may be easier to decode them in an order different from the aforementioned order. Thus, it may or may not be beneficial to impose the order on the downlink when multi-user detection is used.

Figure 7:
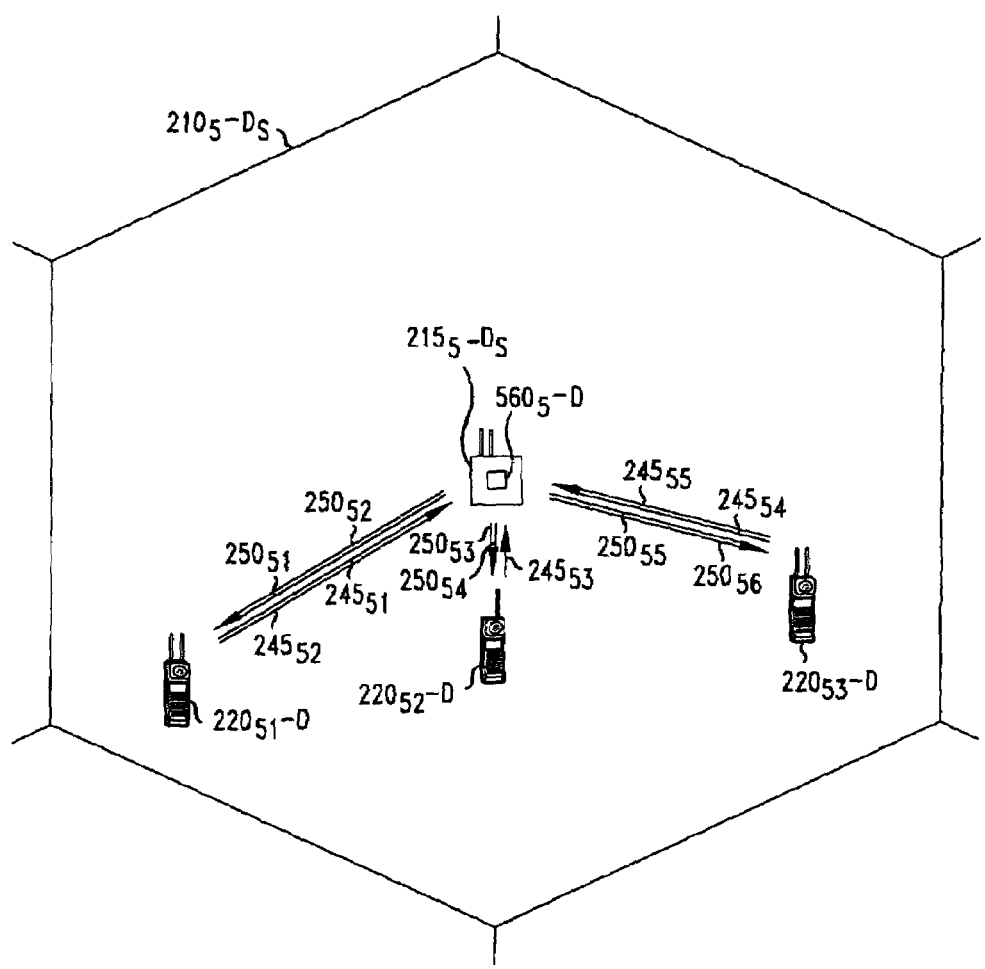
FIG. 7 illustrates in more detail a cell of the wireless communication system of FIG. 1 when the order is imposed on the mobile terminals in the cell and dirty-paper coding is used to compensate for interference among signals within the cell.

FIG. 7 illustrates in more detail cell $210_5$ when the order is imposed on the mobile terminals in the cell, pursuant to the principles of the invention, and dirty-paper coding is used to compensate for interference among signals within the cell. The cell is represented by $210_5$-$D_S$, with $D_S$ used throughout the description and figures to represent that dirty paper coding with order is used.

As described above with reference to FIG. 4a, cell $110_5$-D can operate 1) using the assignment of data rates/power levels based on the highest obtainable system throughput for this particular system when multi-user detection uses this order, or 2) using multi-user detection that uses this order and determining the data rates and/or power levels assigned to the mobile terminals based on the requirements of the mobile terminals without regard to the interference introduced by the terminals having a lower index the order, and without the determination of the highest system throughput, in accordance with the invention. Cell $210_5$-$D_S$, shown in FIG. 7, is the version of cell $110_5$-D that does not determine the highest system throughput and in which the base station and/or some of the mobile terminals of cell $210_5$ have multiple transmit and/or receive antennas. Cell $210_5$-M can be used in wireless communication system 100 instead of cell $110_5$.

Similarly to the above described embodiment where order is used with multi-user detection, shown in FIG. 6, the order can be determined by processor $560_5$-D, or it can be determined by any processor or other equipment within wireless system 100 and then passed to base station $115_5$-$D_S$. As described above, the order can be determined randomly or, alternatively, the order can be based on some predefined criterion or criteria that may prove advantageous in using as much system throughput as possible, as described above.

In the illustrative embodiment, for example, the order is based on the amount of data to be transmitted to the various mobile terminals, with smallest amount of data being first and the largest being last. If at a particular time mobile terminal $220_{51}$ has the smallest amount of data, mobile terminal $220_{52}$ has the next smallest, and mobile terminal $220_{53}$ has the largest, then the order of the mobile terminals is $220_{51}$ first, $220_{52}$ second, and $220_{53}$ third. So, base station $215_5$-M will process signals $225_{55}$ and $225_{56}$ first, signals $225_{53}$ and $225_{54}$ second, and signals $225_{51}$ and $225_{52}$ third. This order means that on the downlink mobile terminals $220_{52}$ and $220_{53}$ are phantoms to mobile terminal $220_{51}$, and mobile terminal $220_{53}$ is a phantom to mobile terminal $220_{52}$.

Because mobile terminals $220_{52}$ and $220_{53}$ are phantoms to mobile terminal $220_{51}$, the signals of mobile terminals $220_{52}$ and $220_{53}$ do not interfere with the signals of mobile terminal $220_{51}$ then the signal to mobile terminal $220_{51}$ can be assigned a data rate and a power level based on its requirements without consideration of the signal to mobile terminals $220_{52}$ and $220_{53}$ and without consideration of the highest obtainable system throughput. So, as described above if mobile terminal $220_{51}$ is constrained to a certain power level or certain data rate, then mobile terminal $220_{51}$s other criteria can be determined using the consideration that the signals to mobile terminal $220_{51}$ are not interfered with by the signals to mobile terminals $220_{52}$ and $220_{53}$. The data rate or power level can be determined using well-known techniques such as water pouring, described in the J. J. Raleigh, and J. M. Cioffi "Spacial-Temporal Coding for Wireless Communication" reference, and the R. R. Farrokhi, G. J, Foschini, R. A. Valenzuela "Link-Optimal Space-Time Processing with Multiple Transmit and Receive Antennas" reference.

Similarly because mobile terminal $220_{53}$ is a phantom to mobile terminal $220_{52}$, mobile terminal $220_{52}$ can be assigned a data rate and a power level based on its requirements without consideration of the signal to mobile terminal $220_{53}$ and without consideration of the highest obtainable system throughput.

Thus, the data rate and/or power level is assigned to the mobile terminals without determining the maximal system throughput, and without determining the maximal the weighted system throughput. Additionally, the data rate and/or power level are assigned such that the data rates of the terminals having a lower index in the order will not be decreased due to the presence of the terminals having a higher index in the order, and power levels of the terminals having a lower index in the order will not be increased due to the presence of the terminals having a higher index in the order.

On the downlink cell $210_5$-$D_S$ operates as described above with reference to FIG. 4a, except to detect the signals the base station has to use techniques used to detect signals in multiple antenna environments. This can be accomplished as described above using water pouring. Note that the signals to the same mobile terminal, even when there are several signals to the same mobile terminal, count as only one element in the scheme of the order, there can be exceptions when the signal are carrying files that have different performance needs.

As described above, currently, it is impractical to use dirty paper coding on the uplink. However, if it were possible dirty paper coding is used on the uplink, the order can be imposed on the uplink in addition to or instead of on the downlink.

As described above, both 1) assigning the data rate and/or power levels to the mobile terminals based on the requirements of the mobile terminals without regard to the interference introduced by the terminals having a higher index the order, and without the determination of the highest system throughput, in accordance with the invention, and 2) using dirty paper coding on the downlink and multi-user detection improves the overall performance of the wireless communication system, in accordance with co-pending U.S. patent application Ser. No. 10/005,506 filed concurrently herewith by Foschini et al., and assigned to the assignee hereof, entitled "Wireless Communication System With Interference Compensation". In the preferred embodiment of the invention, the two are used together, as shown in FIG. 8.

Figure 8:
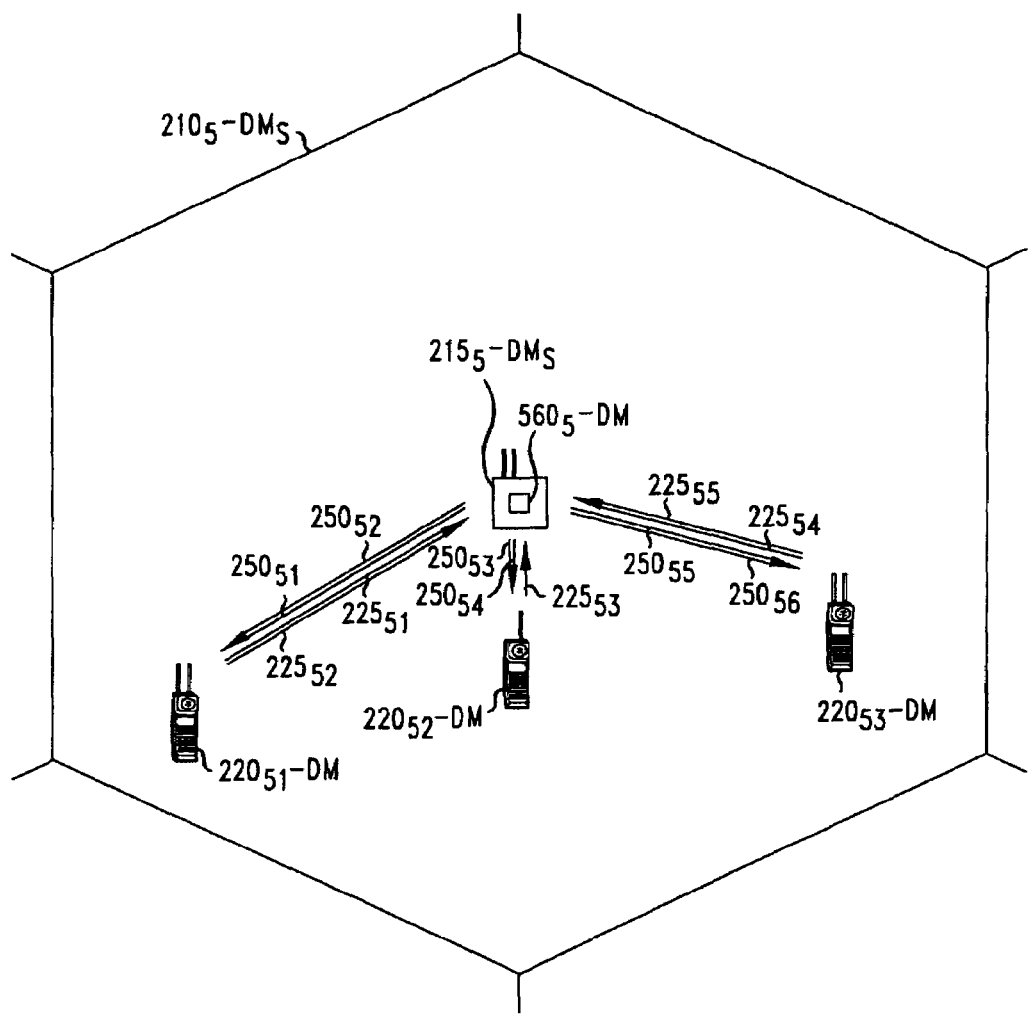
FIG. 8 illustrates in more detail a cell of the wireless communication system of FIG. 1 when the order is imposed on the mobile terminals in the cell, pursuant to the principles of the invention, and dirty-paper coding is used on the downlink and multi-user detection is used on the uplink in accordance with an embodiment of the invention.

FIG. 8 illustrates in more detail cell $210_5$ when the order is imposed on the mobile terminals in the cell, pursuant to the principles of the invention, and dirty paper coding is used on the downlink and multi-user detection is used on the uplink. The cell is represented by $210_5$-$DM_S$, with $DM_S$ used throughout the description and figures to represent that dirty paper coding with order is used on the downlink and multi-user detection with order is used on the uplink.

As described above with reference to FIG. 5, cell $110_5$-DM can operate 1) using the assignment of data rates/power levels based on the highest obtainable system throughput for this particular system when multi-user detection uses this order, or 2) using multi-user detection that uses this order and determine the data rates and/or power levels assigned to the mobile terminals based on the requirements of the mobile terminals without regard to the interference introduced by the terminals having a higher index the order, and without the determination of the highest system throughput, in accordance with the invention. Cell $210_5$-$DM_S$, shown in FIG. 8, is the version of cell $110_5$-DM that does not determine the highest system throughput and in which the base station and/or some of the mobile terminals of cell $210_5$ have multiple transmit and/or receive antennas. Cell $210_5$-M can be used in wireless communication system 100 instead of cell $110_5$.

Similarly to the above described embodiments, the order can be determined by processor $560_5$-DM, or it can be determined by any processor or other equipment within wireless system 100 and then passed to base station $215_5$-$DM_S$. As described above the order can be determined randomly or, alternatively, the order can be based on some predefined criterion or criteria that may prove advantageous in using as much system throughput as possible, as described above. In the illustrative embodiment of cell $210_5$-$DM_S$ order is imposed for both the downlink and the uplink.

When order is used on both links either 1) the same criteria can be used to determine the order on both downlink and uplink communications, or, alternatively, 2) different criteria can be used for downlink and uplink communication. For example, on the uplink the order can be based on the order in which the mobile terminals initiated a communication session with the base station, and on the downlink the order might be based on the amount of data to be transmitted to the various mobile terminals.

On the uplink cell $210_5$-$DM_S$ operates as described above with reference to the uplink shown in FIG. 6, and on the downlink cell $110_5$-$DM_S$ operates as described above with reference to the downlink shown in FIG. 7.

FIGS. 6, 7, and 8 illustrate how the order can be imposed on each cell independently of the order imposed in other cells. When the order is imposed independently on each cell, then the order in each cell can be the same or different from each other. Furthermore, the order can be imposed one both links in some cells, only one link in other cells, and not imposed at all in yet other cells.

Alternatively, and advantageously, the order can be imposed on a portion, or all, or wireless communication system 100. Using the order in the multi-cell context provides the advantage of an even larger throughput improvement than the one cell context.

Figure 9:
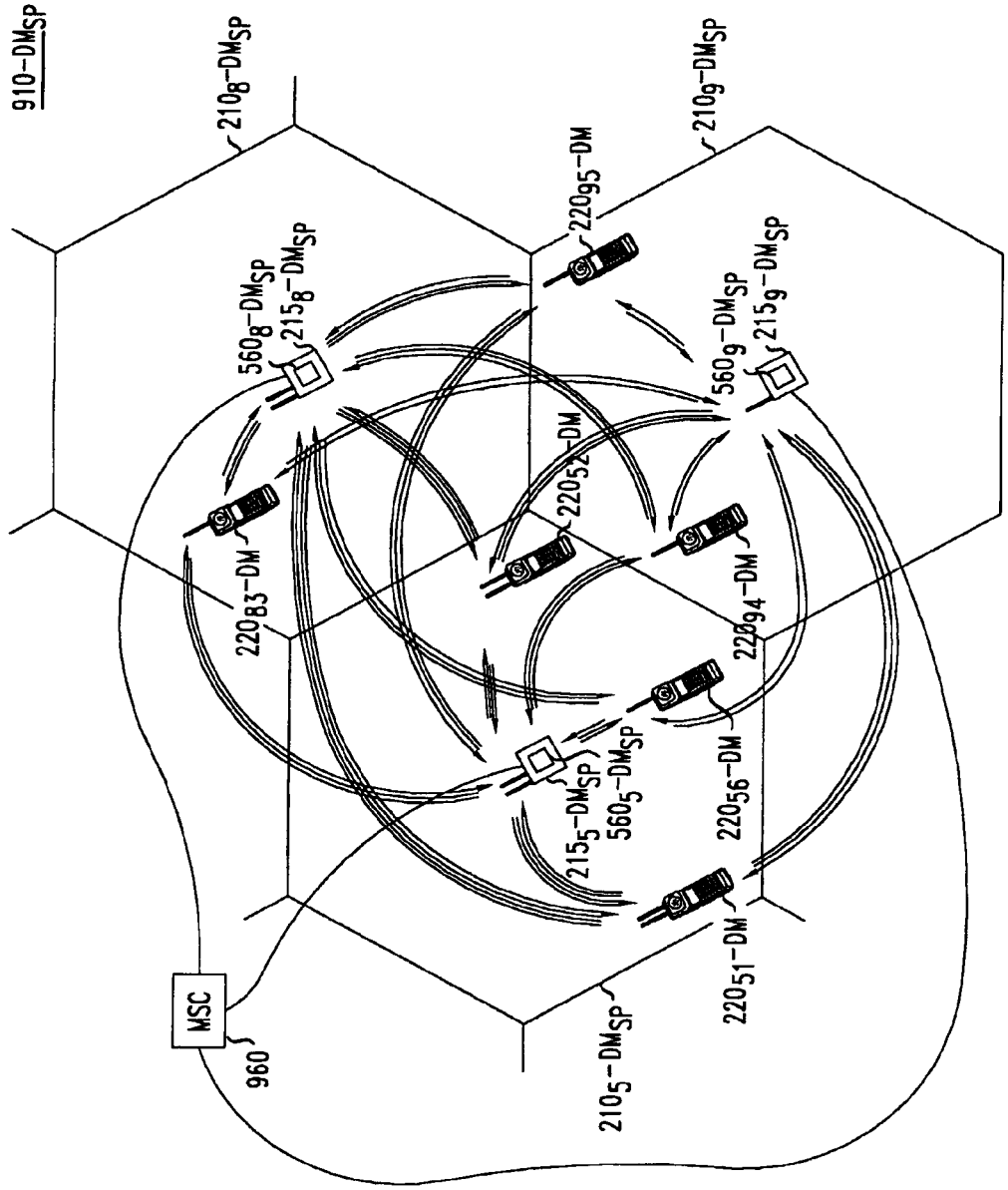
FIG. 9 illustrates in more detail a multi-cell portion of the wireless communication system of FIG. 1 when the order is imposed on the mobile terminals in the cells, pursuant to the principles of the invention, and dirty-paper coding is used on the downlink and multi-user detection is used on the uplink in accordance with an embodiment of the invention.

FIG. 9 illustrates in more detail multi-cell portion $910$-$DM_{SP}$ of wireless communication system 100 when the order is imposed on the mobile terminals in the entire portion and dirty paper coding is used on the downlink and multi-user detection is used on the uplink. Multi-cell portion $910$-$DM_{SP}$ includes cells $210_5$-$DM_{SP}$, $210_8$-$DM_{SP}$, and $210_9$-$DM_{SP}$, with $DM_{SP}$ used throughout the description and figures to represent that in a portion of a wireless communication system dirty-paper coding with order is used on the downlink, and multi-user detection with order is used on the uplink.

Similarly to cell $210_5$-$DM_S$ (shown in FIG. 8), cell $210_5$-$MD_{SP}$ includes base station $215_5$-$MD_{SP}$ and mobile terminals $220_{51}$-MD, $220_{52}$-MD, and $220_{56}$-MD. Cell $210_8$-$MD_{SP}$ includes base station $215_8$-$MD_{SP}$ and mobile terminal $220_{83}$-

MD. Cell $210_9$-MD$_{SP}$ includes base station $215_9$-MD$_{SP}$ and mobile terminals $220_{94}$-MD, and $220_{95}$-MD. Each of the base stations and mobile terminals can have one or more than one antennas. Conditions permitting, all of the base stations $215_5$-DM$_{SP}$, $215_8$-DM$_{SP}$, and $215_9$-DM$_{SP}$ communicate with all of the mobile terminals $220_{51}$-MD, $220_{52}$-DM, $220_{56}$-DM, $220_{83}$-DM, $220_{94}$-DM, and $220_{95}$-MD. There is an uplink signal between each antenna of each of the mobile terminals and each antenna of each of the base stations; and there is a downlink signal between each antenna of each of the base stations and each antenna of each of the mobile terminals.

Base stations $215_5$-DM$_{SP}$, $215_8$-DM$_{SP}$, and $215_9$-DM$_{SP}$, also communicate with MSC 960. In one embodiment of the invention, MSC 960 determines the selected downlink order—the order used on the downlink—and the selected uplink order—the order used on the uplink. On the downlink MSC 960 processes the signals to be transmitted in accordance with the selected downlink order using dirty paper coding. On the uplink MSC 960 decodes the received signals in accordance with the selected uplink order using multi-user detection. In other embodiments of the invention the order (the selected uplink order or the selected downlink order, or both) can be determined at any processor, controller, or other equipment within the wireless communication system, including one of the base station processors, such as for example, $560_5$-DM$_{SP}$. On the downlink, the equipment that determines the order will either process the signals to be transmitted in accordance with the order, or will pass the order to other equipment that will process the signals. Preferably the equipment that process the signals to be transmitted has access to the signals to be transmitted to all of the mobile terminals in the plurality of mobile terminals on which a particular order is imposed. Similarly, on the uplink, the equipment that determines the order will either decode the received signal in accordance with the order, or will pass the order to other equipment that will decode the received signal.

The order can be determined as described above. In the illustrative embodiment, for example, the order on both the uplink and downlink is based on the order in which mobile terminals initiated a communication session with the base stations. (Although, as described above, the selected downlink order can be based on different criteria than the selected uplink order.) Note that as described above, the signals from the same mobile terminal, even when there are several signals from the same mobile terminal to several base stations, count as only one element in the scheme of the order, there can be exceptions when the signal are carrying files that have different performance needs.

If mobile terminal $220_{51}$-DM initiated a communication session with the base stations first, mobile terminal $220_{52}$-DM second, mobile terminal $220_{83}$-DM third, mobile terminal $220_{94}$-DM fourth, mobile terminal $220_{95}$-DM fifth, and mobile terminal $220_{56}$-DM sixth, then this is the order of the mobile terminals. Thus, on the downlink MSC 960 uses the signals to mobile terminal $220_{56}$-DM in determining the signal to mobile terminal $220_{95}$-DM, and mobile terminal $220_{56}$-DM is a phantom to mobile terminal $220_{95}$-DM. Similarly, MSC 960 uses the signals to mobile terminals $220_{95}$-DM $220_{56}$-DM to determine the signal to mobile terminal $220_{94}$-DM, and so mobile terminals $220_{95}$-DM and $220_{56}$-DM are phantoms to mobile terminal $220_{94}$-DM. This process continues until MSC 960 uses the signals to mobile terminals $220_{52}$-DM, $220_{83}$-DM, $220_{94}$-DM, $220_{95}$-DM and $220_{56}$-DM in determining the signal to mobile terminal $220_{51}$-DM, and so mobile terminals $220_{52}$-DM, $220_{83}$-DM, $220_{94}$-DM, $220_{95}$-DM and $220_{56}$-DM are phantoms mobile terminal $220_{51}$-DM.

Similarly on the uplink, MSC 960 decodes the uplink the signals mobile terminal $220_{56}$-DM to all of the base stations first. MSC 960 then decodes the uplink signals from mobile terminal $220_{95}$-DM to all of the base stations second, from mobile terminal $220_{94}$-DM third, from $220_{83}$-DM fourth, from $220_{52}$-DM fifth, and from $220_{51}$-DM sixth.

FIG. 10 illustrates, for the portion of the system shown in FIG. 9, which mobile terminals' signals are taken account of in compensating for interference in which other terminals' signals, thus illustrating which mobile terminals are phantoms to which other mobile terminals.

Because mobile terminals $220_{52}$-DM, $220_{83}$-DM, $220_{94}$-DM, $220_{95}$-DM and $220_{56}$-DM are phantoms to mobile terminal $220_{51}$, the signal to mobile terminal $220_{51}$ can be assigned a data rate and a power level based on its requirements without consideration of the signal to mobile terminals $220_{52}$-DM, $220_{83}$-DM, $220_{94}$-DM, $220_{95}$-DM and $220_{56}$-DM and without consideration of the highest obtainable system throughput. As described above, if mobile terminal $220_{51}$ is constrained to a certain power level or requires a certain data rate, then mobile terminal $220_{51}$s other criteria can be determined using the consideration that the signals to mobile terminal $220_{51}$ are not interfered with by the signals to mobile terminals $220_{52}$-DM, $220_{83}$-DM, $220_{94}$-DM, $220_{95}$-DM and $220_{56}$-DM.

Similarly because mobile terminals $220_{83}$-DM, $220_{94}$-DM, $220_{95}$-DM and $220_{56}$-DM are phantoms to mobile terminal $220_{52}$, mobile terminal $220_{52}$ can be assigned a data rate and a power level based on its requirements without consideration of the signal to mobile terminals $220_{83}$-DM, $220_{94}$-DM, $220_{95}$-DM and $220_{56}$-DM and without consideration of the highest obtainable system throughput.

Thus, the data rate and/or power level is assigned to the mobile terminals without determining the maximal system throughput, and without determining the maximal the weighted system throughput. Additionally, the data rate and/or power level are assigned such that the data rates of the terminals having a lower index in the order will not be decreased due to the presence of the terminals having a higher index in the order, and power levels of the terminals having a lower index in the order will not be increased due to the presence of the terminals having a higher index in the order.

FIG. 9 illustrates an embodiment of the invention where order can be imposed on both the downlink and the uplink in a portion of a wireless communication system when dirty paper coding is used on the downlink and multi-user detection is used on the uplink. In alternative embodiments of the invention order can be used to impose the order in which signals are taken into account in any compensation scheme that uses techniques that compensate for interference among signals within the system. For example, the order can be imposed on the downlink and/or the uplink when multi-user detection is used on both the downlink and the uplink. Similarly, the order can be imposed on the downlink and/or the uplink if dirty paper coding can be used on both the downlink and the uplink.

As can be seen from FIGS. 8 and 9 and the related descriptions, once it is known which mobile terminals are included in a particular order—an order used for a particular set of mobile terminals—and the order is imposed, the signals to and/or from the mobile terminals are processed in a similar manner regardless of whether the mobile terminals are communicating with one base station having many antennas or with many base stations having one or many antenna. Thus, the multi-cell portion can be viewed as one unit.

Figure 11:
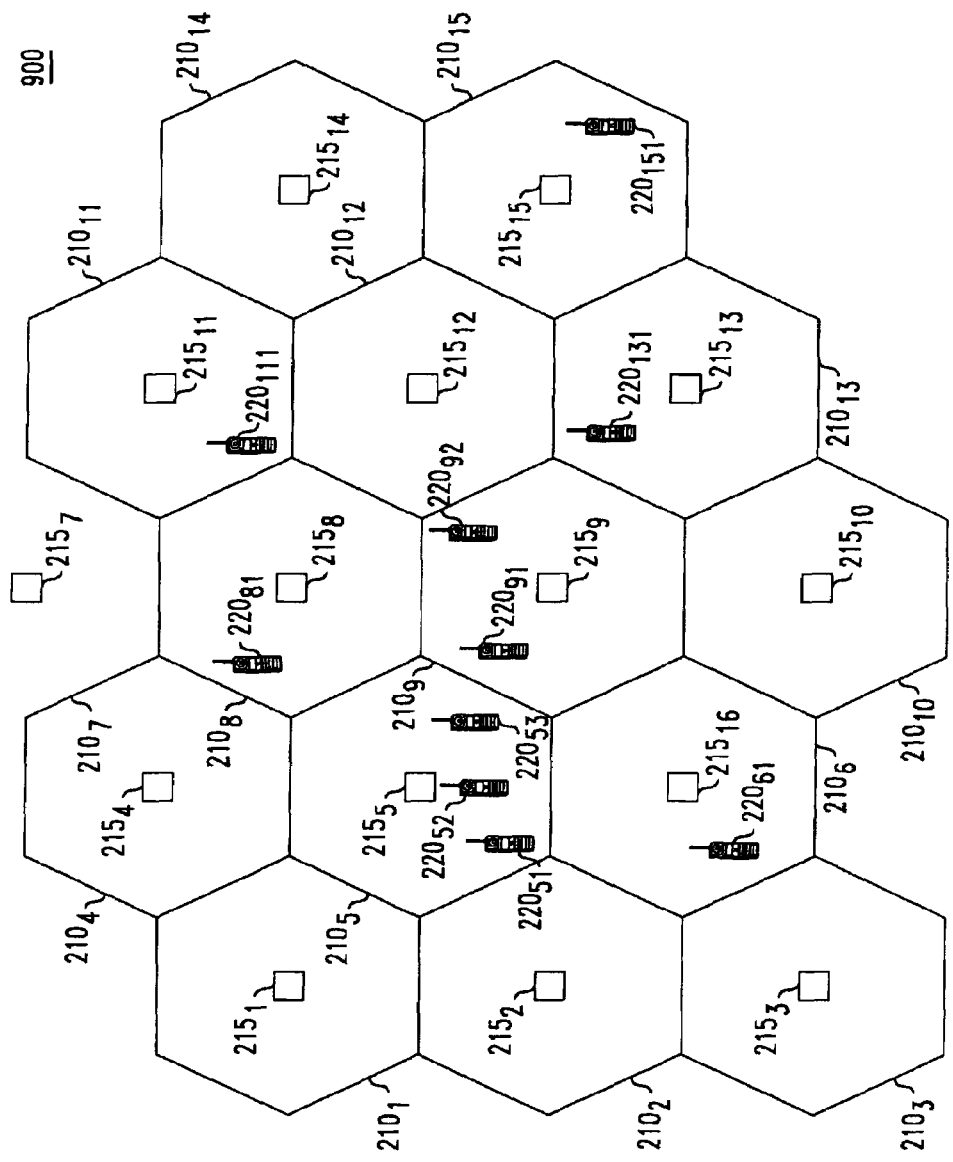
FIG. 11 illustrates a wireless communication system similar to that shown in FIG. 1 where the order is imposed on the mobile terminals in the entire wireless communication system, pursuant to the principles of the invention, and dirty-paper coding is used on the downlink and multi-user detection is used on the uplink in accordance with an embodiment of the invention.

The multi-cell portion can include some of the cells of a wireless communication system as shown in FIG. 9, or the first multi-cell portion can include all of the cells in a wireless communication as shown in FIG. 11. FIG. 11 illustrates wireless communication system 900 where order is imposed on the mobile terminals in the entire wireless communication system pursuant to the principles of the invention, and dirty-paper coding is used on the downlink and multi-user detection is used on the uplink in accordance with an embodiment of the invention. As described above, order can be used to impose the order in which signals are taken into account in any compensation scheme that uses techniques that compensate for interference among signals within the system, regardless of whether the same of different compensation schemes are used on the uplink or downlink.

Preferably, for both the uplink and the downlink, the transmitter requires (must know) the channel characteristics of the channel over which it is about to transmit the signals. Knowing the channel allows transmission using the concept of so-called virtual antennas. The concept of virtual antennas allows the signals to and/or from multi transmit and/or receive antennas between the same mobile terminal and base station not to interfere with each other. For more information on virtual antennas (eigenmodes) see, for example, the R. R. Farrokhi, G. J, Foschini, R. A. Valenzuela "Link-Optimal Space-Time Processing with Multiple Transmit and Receive Antennas" reference.

The foregoing is merely illustrative and various alternatives will now be discussed. For example, in the illustrative embodiments the order is descending, that is the signal with the order of one suffer the least number interferers, namely none. In alternative embodiments of the invention, the order can be ascending, that is, the signals with the order one suffer the most number interferers. In this case, the signals are processed from the mobile terminal with last index order to the mobile terminal with the order of one. (For example, when multi-user detection is used, the signal from the mobile terminal with the last index order will be decoded first; and when dirty paper coding is used, the signal with the last index order is processed first.)

Although fifteen cells are shown in the illustrative embodiment, wireless communication system can contain any number of cells. One skilled in the art will appreciate that the wireless communication system can include significantly more than fifteen cells, which can extend outward from the illustrated fifteen cell. Alternatively, the wireless communication system can include fewer than fifteen cells.

In the illustrative embodiments the same compensation scheme is used on the downlink for all of the mobile terminals. In alternative embodiments of the invention, one compensation scheme can be used for some of the mobile terminals and another compensation scheme can be used for other mobile terminals. In this case, one selected downlink order is imposed on the first group of terminal, and a different order is imposed on a different group of terminal. For example, dirty paper coding can be used for most of the mobile terminals and multi-user detection can be used for other mobile terminals. Using multi-user detection for some mobile terminals may be beneficial when multi-user detection provides as good interference compensation as dirty paper coding for the particular mobile terminals. Similarly for the uplink one compensation scheme can be used for some of the mobile terminals and another compensation scheme can be used for other mobile terminals.

In the illustrative embodiments the same order is imposed on the same link (uplink or downlink) for all of the mobile terminals that are physically in a certain portion (whether one cell or multi-cell portion) of a wireless communication system. In alternative embodiments of the invention, a first order can be imposed on a first plurality of mobile terminals and a second order can be imposed on a second plurality of terminals, were both pluralities of mobile terminals are in the same portion of the wireless communication system. The first and second orders can be based on the same or on different based on different criteria. A particular mobile terminal can belong to the first plurality at a first time and to the second plurality in a second time, regardless of whether the particular mobile terminal changed locations.

Order can be used in a one cell or multi-cell portion of a wireless communication system where the mobile terminals, the base stations or both, can have either one or multiple transmit and/or receive antennas. Furthermore, the number of transmit and/or receive antennas can vary from mobile terminal to mobile terminals and/or from base station to base station.

In the illustrative embodiment the antennas shown are both transmit and receive antennas, and equipment in the receiver separates received signals from the transmitted signals. In alternative embodiments, the receive and transmit antennas can be separate antennas. The number of receive and transmit at a particular mobile terminals and/or base station can be equal to each other or different from each other.

Additional compensation techniques can be used on the uplink, the downlink, or both to further improve the throughput. For example, the well-known techniques of time-sharing can be used in conjunction with dirty paper coding and/or multi-user detection. In this case, time-sharing can be used, for example, to have the signals between a particular mobile terminal and base station transmitted at certain rates at one time and at different rates at another time.

Additionally, one skilled in the art will recognize that although in the illustrative embodiment each cell is an omni sector, the cell can be divided into a plurality of sectors, with each sector having its own antennas.

Furthermore, although the terminals are illustrated as mobile telephones, the mobile terminals can be any terminals capable of wireless communication, such as, for example, fixed telephones, or computers.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in at least a portion of a wireless communication system in which signals are communicated between at least one of one or more base stations and respective ones of a plurality of terminals, the method comprising the steps of:

using a compensation scheme to compensate for interference among the signals, the compensation being performed using an order of the terminals that defines which terminals' signals are used to compensate for interference in which other terminals' signals; and assigning at least one operating parameter value to at least one of the terminals, the assigning being based on a predetermined methodology, the methodology being based on one or more criteria none of which is the theoretically highest system throughput.

2. The method of claim 1, wherein the operating parameter includes at least one of the following: data rate, power level, and set of data rates.

3. The method of claim 1, wherein the operating parameter values are assigned to the terminals in the order.

4. The method of claim 1, wherein the terminals are mobile terminals.

5. The method of claim 1, wherein at least one of operating parameter values of terminals, of the plurality, that have a lower index in the order will not be made worse due to the presence of terminals, of the plurality, having a higher index in the order, the operating parameter values include the assigned operating parameter value.

6. The method of claim 1, wherein:
the compensation scheme is dirty paper coding; and
the signals comprise downlink signals, downlink signals being signals communicated from the one or more base stations to the respective ones of the plurality of terminals.

7. The method of claim 1, wherein:
the signals comprise downlink signals and uplink signals, downlink signals being signals communicated from the one or more base stations to the respective ones of the plurality of terminals, uplink signals being signals communicated to the one or more base stations form the respective ones of the plurality of terminals;
the compensation scheme is used for downlink signals; and
a second compensation scheme is used for uplink signals to compensate for interference among the uplink signals uplink, the compensation being performed using a second order of the terminals that defines which terminals' uplink signals are used to compensate for interference in which other terminals' uplink signals.

8. The method of claim 7, wherein the second order is based on at least one different criterion than the first order.

9. The method of claim 1, wherein the order is based on at least one of the following criteria:
the order in which the terminals of the plurality initiated a communication session with the one or more base stations;
the reverse of the order in which the terminals of the plurality initiated a communication session with the one or more base stations;
the respective amounts of data to be transmitted between the terminals and the one or more base stations; and
randomness.

10. The method of claim 1, wherein the order is defined by:
a) identifying an individual one of the terminals for which a certain operating parameter value would be optimal in the absence of interference from the other terminals in the plurality;
b) assigning the individual terminal in step a) to have an index of 1;
c) identifying another individual one of the terminals for which the certain operating parameter value would be optimal in the presence of interference from the assigned terminals in the plurality and in the absence of interference from unassigned terminals in the plurality;
d) assigning the individual terminal in step c) to have the next yet unassigned index in the order; and
e) repeating steps c) and d) until all of the terminals in the plurality are assigned an index in the order.

11. The method of claim 10, wherein:
the certain operating parameter comprises data rate; and
the optimal operating parameter value is the data rate having the highest magnitude of the data rates of the respective terminals.

12. The method of claim 11 wherein at least one other operating parameter of the terminals is fixed.

13. The method of claim 1, wherein, in the portion, signals are communicated between at least one of the one or more base stations and a respective one of a second plurality of terminals, and the method further comprises the step of:
using a second compensation scheme to compensate for interference among the signals between the at least one of the one or more base stations and the second plurality of terminals, the compensation being performed using a second order to determine which of the second plurality terminals' signals are used to compensate for interference in which other of the second plurality terminals' signals.

14. A method for use in at least a portion of a wireless communication system in which signals are communicated between at least one of one or more base stations and respective ones of a plurality of terminals, the method comprising the steps of:
using a compensation scheme to compensate for interference among the signals, the compensation being performed using an order of the terminals that defines which terminals' signals are used to compensate for interference in which other terminals' signals; and
assigning at least one operating parameter value to the terminals in the plurality, the assignment to a particular terminal being such that at least one of operating parameter values of terminals, of the plurality, that have a lower index in the order will not be made worse due to the presence of terminals, of the plurality, having a higher index in the order, the operating parameter values include the assigned operating parameter value.

15. The method of claim 14, wherein the operating parameter includes at least one of the following: data rate, power level, and set of data rates.

16. The method of claim 14, wherein the operating parameter values are assigned to the terminals in the order.

17. The method of claim 14, wherein the terminals are mobile terminals.

18. The method of claim 14, wherein:
the compensation scheme is dirty paper coding; and
the signals comprise downlink signals, downlink signals being signals communicated from the one or more base stations to the respective ones of the plurality of terminals.

19. The method of claim 14, wherein:
the signals comprise downlink signals and uplink signals, downlink signals being signals communicated from the one or more base stations to the respective ones of the plurality of terminals, uplink signals being signals communicated to the one or more base stations form the respective ones of the plurality of terminals;
the compensation scheme is used for downlink signals; and
a second compensation scheme is used for uplink signals to compensate for interference among the uplink signals uplink, the compensation being performed using a second order of the terminals that defines which terminals' uplink signals are used to compensate for interference in which other terminals' uplink signals.

20. The method of claim 19, wherein second order is based on at least one different criterion than the first order.

21. The method of claim 14, wherein the order is based on at least one of the following criteria:
  the order in which the terminals of the plurality initiated a communication session with the one or more base stations;
  the reverse of the order in which the terminals of the plurality initiated a communication session with the one or more base stations;
  the respective amounts of data to be transmitted between the terminals and the one or more base stations; and
  randomness.

22. The method of claim 14, wherein the order is defined by:
  a) identifying an individual one of the terminals for which a certain operating parameter value would be optimal in the absence of interference from the other terminals in the plurality;
  b) assigning the individual terminal in step a) to have an index of one;
  c) identifying another individual one of the terminals for which the certain operating parameter value would be optimal in the presence of interference from the assigned terminals in the plurality and in the absence of interference from unassigned terminals in the plurality;
  d) assigning the individual terminal in step c) to have the next yet unassigned index in the order; and
  e) repeating steps c) and d) until all of the terminals in the plurality are assigned an index in the order.

23. The method of claim 22, wherein:
  the operating parameter comprises data rate; and
  the optimal operating parameter value is the data rate having the highest magnitude of the data rates of the respective terminals.

24. The method of claim 23, wherein at least one other operating parameter of the terminals is fixed.

25. The method of claim 14, wherein in the portion signals are communicated between at least one of the one or more base stations and a respective one of a second plurality of terminals, and the method further comprises the step of:
  using a second compensation scheme to compensate for interference among the signals between the at least one of the one or more base stations and the second plurality of terminals, the compensation being performed using a second order to determine which of the second plurality terminals' signals are used to compensate for interference in which other of the second plurality terminals' signals.

26. A method for use in at least a portion of a wireless communication system in which signals are communicated between at least one of one or more base stations and respective ones of a plurality of terminals, the method comprising the steps of:
  using a compensation scheme to compensate for interference among the signals, the compensation being performed using an order of the terminals that defines which terminals' signals are used to compensate for interference in which other terminals' signals; and
  assigning a data rate to the terminal such that the data rates of the terminals having a lower index in the order will not be decreased due to the presence of the terminals having a higher index in the order, and without changing the power covariance matrixes of antennas involved in the communication with the terminals having the lower index.

* * * * *